United States Patent
Lee et al.

(10) Patent No.: US 10,425,409 B2
(45) Date of Patent: Sep. 24, 2019

(54) METHOD AND APPARATUS FOR CONNECTING BETWEEN ELECTRONIC DEVICES USING AUTHENTICATION BASED ON BIOMETRIC INFORMATION

(71) Applicant: SAMSUNG ELECTRONICS CO., LTD., Suwon-si, Gyeonggi-do (KR)

(72) Inventors: Gwiho Lee, Uiwang-si (KR); Hakjoo Kim, Yongin-si (KR); Sangho Park, Anyang-si (KR); Yong-Jun Park, Suwon-si (KR); Jong-Hoon Park, Suwon-si (KR); In-Jun Son, Suwon-si (KR); Yang Soo Lee, Yongin-si (KR); Moonsu Chang, Yongin-si (KR); Ho-Dong Jwa, Suwon-si (KR); Wooyoung Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 238 days.

(21) Appl. No.: 15/436,123

(22) Filed: Feb. 17, 2017

(65) Prior Publication Data
US 2017/0244703 A1   Aug. 24, 2017

(30) Foreign Application Priority Data

Feb. 19, 2016 (KR) .................. 10-2016-0020018

(51) Int. Cl.
*H04L 29/06* (2006.01)
*H04W 12/06* (2009.01)
*G06K 9/00* (2006.01)

(52) U.S. Cl.
CPC .......... *H04L 63/0861* (2013.01); *G06K 9/001* (2013.01); *G06K 9/0002* (2013.01);
(Continued)

(58) Field of Classification Search
CPC ......... G06Q 20/3278; G06Q 20/38215; G06Q 2220/00; G06Q 20/065; G06Q 20/3678;
(Continued)

(56) References Cited

U.S. PATENT DOCUMENTS

2013/0127980 A1* 5/2013 Haddick .............. G06F 3/013
348/14.08
2013/0231046 A1* 9/2013 Pope .................. G06K 9/00013
455/41.1
(Continued)

FOREIGN PATENT DOCUMENTS

KR    10-2014-0025736    3/2014
KR    10-2014-0036582    3/2014

*Primary Examiner* — Abiy Getachew
(74) *Attorney, Agent, or Firm* — Nixon & Vanderhye P.C.

(57) ABSTRACT

A method and an apparatus for providing a connection between electronic devices using authentication based on biometric information are provided. The electronic device includes: a first communication circuit to support NFC; a second communication circuit to support non-NFC; a biometric sensor; a memory to store first authentication information corresponding to an external device; and a processor. The processor is configured to: acquire connection information related to a connection with the external device from the external device using the first communication circuit in response to NFC tagging between the electronic device and the external device; establish a communication connection with the external device using the second communication circuit based on at least the connection information; receive a request for authentication information from the external device in response to the communication connection being established; acquire biometric information corresponding to a user of the electronic device using the biometric sensor in response to the request; authenticate the user based on at least the biometric information; when the authenticating succeeds, generate second authentication information based (Continued)

on at least the first authentication information; and transmit the second authentication information to the external device.

16 Claims, 20 Drawing Sheets

(52) U.S. Cl.
CPC ....... *G06K 9/0008* (2013.01); *G06K 9/00979* (2013.01); *H04L 63/0492* (2013.01); *H04L 63/0853* (2013.01); *H04W 12/06* (2013.01); *G06K 9/00087* (2013.01)

(58) Field of Classification Search
CPC ........... G06Q 20/3821; G06Q 20/3829; G06Q 20/4097; G06Q 20/3223; G06Q 20/3226; G06Q 20/3674; G06Q 20/3823; G06Q 20/4012; G06Q 20/40; G06Q 20/42; H04B 5/0025; H04B 5/0062; B60R 25/25; G05D 1/0016; G07C 9/00309; H04M 1/7253; H04M 1/72575; H04W 12/06; H04W 12/00508; H04W 12/04; H04W 4/80; G06F 21/35; G06F 21/44; G06K 19/0723; G06K 7/0008; G06K 7/10099; G06K 7/10108; G06K 9/0002; G06K 9/0008; G06K 9/00087; G06K 9/001; G06K 9/00979; H04L 63/0492; H04L 63/0853; H04L 63/0861
See application file for complete search history.

(56) References Cited

U.S. PATENT DOCUMENTS

| | | | |
|---|---|---|---|
| 2014/0087660 A1* | 3/2014 | Kim | H04L 12/282 455/41.1 |
| 2015/0178548 A1 | 6/2015 | Abdallah et al. | |
| 2015/0206366 A1 | 7/2015 | DiVincent et al. | |
| 2016/0054962 A1* | 2/2016 | Park | H04L 41/0806 358/1.15 |

* cited by examiner

METHOD AND APPARATUS FOR CONNECTING BETWEEN ELECTRONIC DEVICES USING AUTHENTICATION BASED ON BIOMETRIC INFORMATION

CROSS REFERENCE TO RELATED APPLICATION

The present application is based on and claims priority under 35 U.S.C. § 119 to Korean Application Serial No. 10-2016-0020018, which was filed in the Korean Intellectual Property Office on Feb. 19, 2016, the content of which is incorporated by reference herein in its entirety.

BACKGROUND

1. Field of the Disclosure

The present disclosure relates generally to a method and an apparatus for providing user information by connecting between electronic devices.

2. Description of Related Art

With the recent enhancement of digital technology, various types of electronic devices, such as a mobile communication terminal, a smart phone, a tablet personal computer (PC), a notebook, a wearable device, a digital camera, a personal computer, or the like, are widely used.

As protection of personal information has become important in recent years, electronic devices provide various services related to user authentication based on user's biometric information (for example, iris information, fingerprint information, or the like). The biometric information is very effective in terms of security and use convenience, and is used in many electronic devices as information for user authentication.

However, in order to authenticate a user using biometric information, an electronic device should have a biometric sensor (for example, a fingerprint recognition sensor or the like) embedded therein, for recognizing (sensing) biometric information, or should be connected with a separate device (for example, a fingerprint recognizer or the like) including a biometric sensor. Accordingly, the electronic device's ability to authenticate a user based on biometric information is very limited according to an electronic device.

SUMMARY

To address the above-discussed deficiencies, the present disclosure provides at least the advantages described below. Accordingly, the present disclosure provides an apparatus and a method for providing a user authentication function for another electronic device using biometric information acquired in an electronic device.

Another example aspect of the present disclosure provides an apparatus and a method which connects wireless communication between a first electronic device having a biometric sensor embedded therein, and a second electronic device having a virtual biometric authentication sensor driver installed therein, and which processes an authentication function of the second electronic device based on biometric information acquired by the first electronic device.

Another example aspect of the present disclosure provides an apparatus and a method for triggering to start a communication connection in a first electronic device when connecting wireless communication between the first electronic device and a second electronic device.

According to an example aspect of the present disclosure, an electronic device includes: a first communication circuit configured to support Near Field Communication (NFC); a second communication circuit configured to support non-NFC; a biometric sensor; a memory configured to store first authentication information corresponding to an external device; and a processor, wherein the processor is configured to: acquire connection information related to a connection with the external device from the external device using the first communication circuit in response to NFC tagging between the electronic device and the external device; establish a communication connection with the external device using the second communication circuit based on at least the connection information; receive a request for authentication information from the external device in response to the communication connection being established; acquire biometric information corresponding to a user of the electronic device using the biometric sensor in response to the request; authenticate the user based on at least the biometric information; when the authenticating succeeds, generate second authentication information based on at least the first authentication information; and transmit the second authentication information to the external device.

According to another example aspect of the present disclosure, a method of operating an electronic device includes: acquiring connection information related to a connection with an external device from the external device in response to Near Field Communication (NFC) tagging between the electronic device and the external device; establishing a communication connection with the external device based on at least the connection information; receiving a request for authentication information from the external device in response to the communication connection being established; acquiring biometric information corresponding to a user of the electronic device using a biometric sensor in response to the request; authenticating the user based on at least the biometric information; when the authenticating succeeds, generating second authentication information based on at least the first authentication information; and transmitting the second authentication information to the external device.

According to another example aspect of the present disclosure, a computer readable recording medium has a program recorded thereon to execute the above-described method in a processor.

According to another example aspect of the present disclosure, a computer readable recording medium has a program recorded thereon, for executing: acquiring connection information related to a connection with an external device; establishing a communication connection with the external device based on at least the connection information; receiving a request for authentication information from the external device; acquiring biometric information corresponding to a user of the electronic device using a biometric sensor; authenticating the user based on at least the biometric information; when the authenticating succeeds, generating second authentication information based on at least the first authentication information; and transmitting the second authentication information to the external device.

BRIEF DESCRIPTION OF THE DRAWINGS

The above and other aspects, features and attendant advantages of the present disclosure will be more readily apparent and appreciated from the following detailed description, taken in conjunction with the accompanying drawings, in which like reference numerals refer to like elements, and wherein.

DETAILED DESCRIPTION

Figure 1:
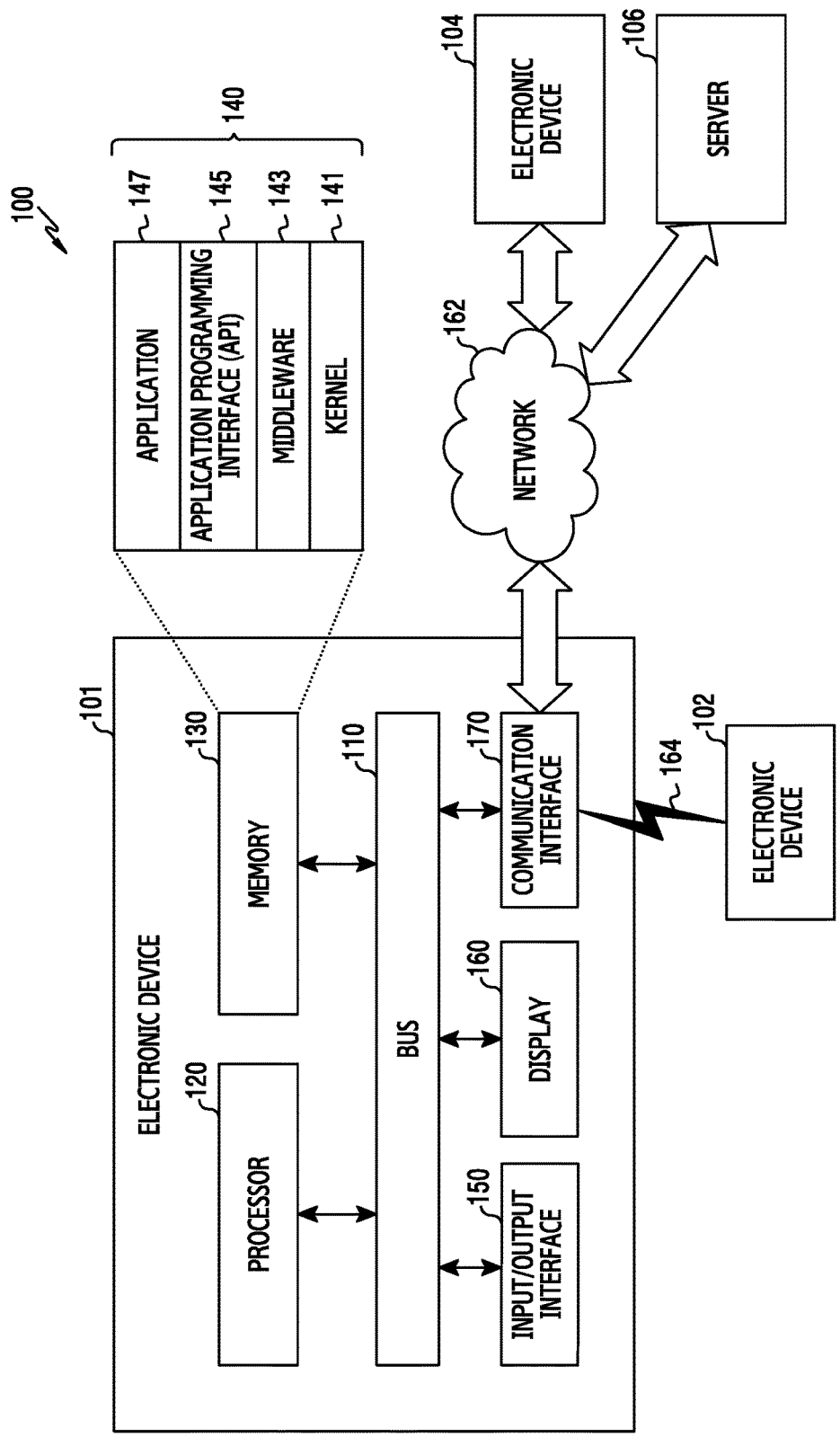
FIG. 1 is a diagram illustrating an example network environment including an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements. As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output interface circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short-range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

For example, the server 106 may include at least one of a certification server, an integration server, a provider server (or a mobile network operator server), a content server, an internet server, or a cloud server.

Figure 2:
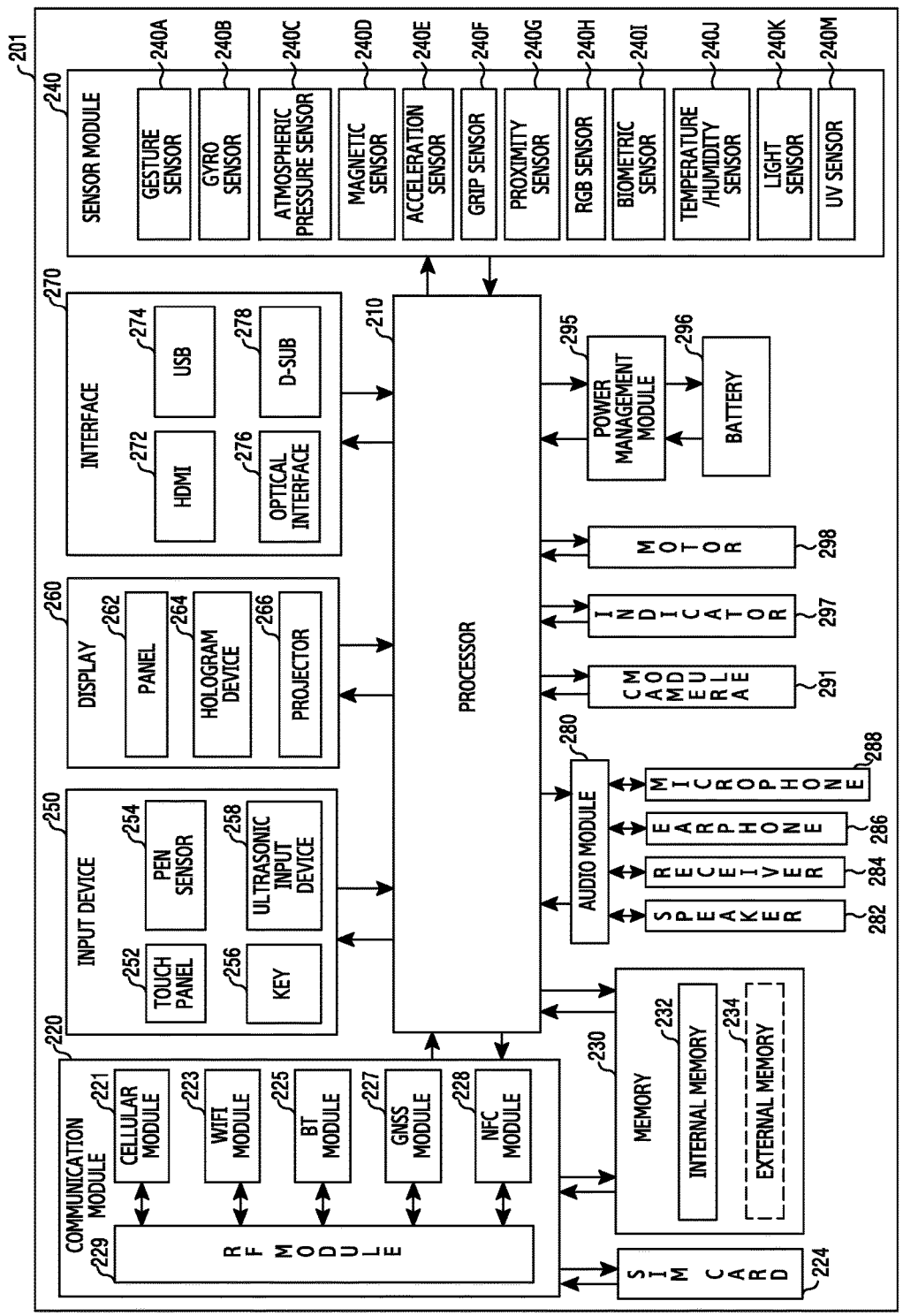
FIG. 2 is a block diagram illustrating an example electronic device according to various example embodiments of the present disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
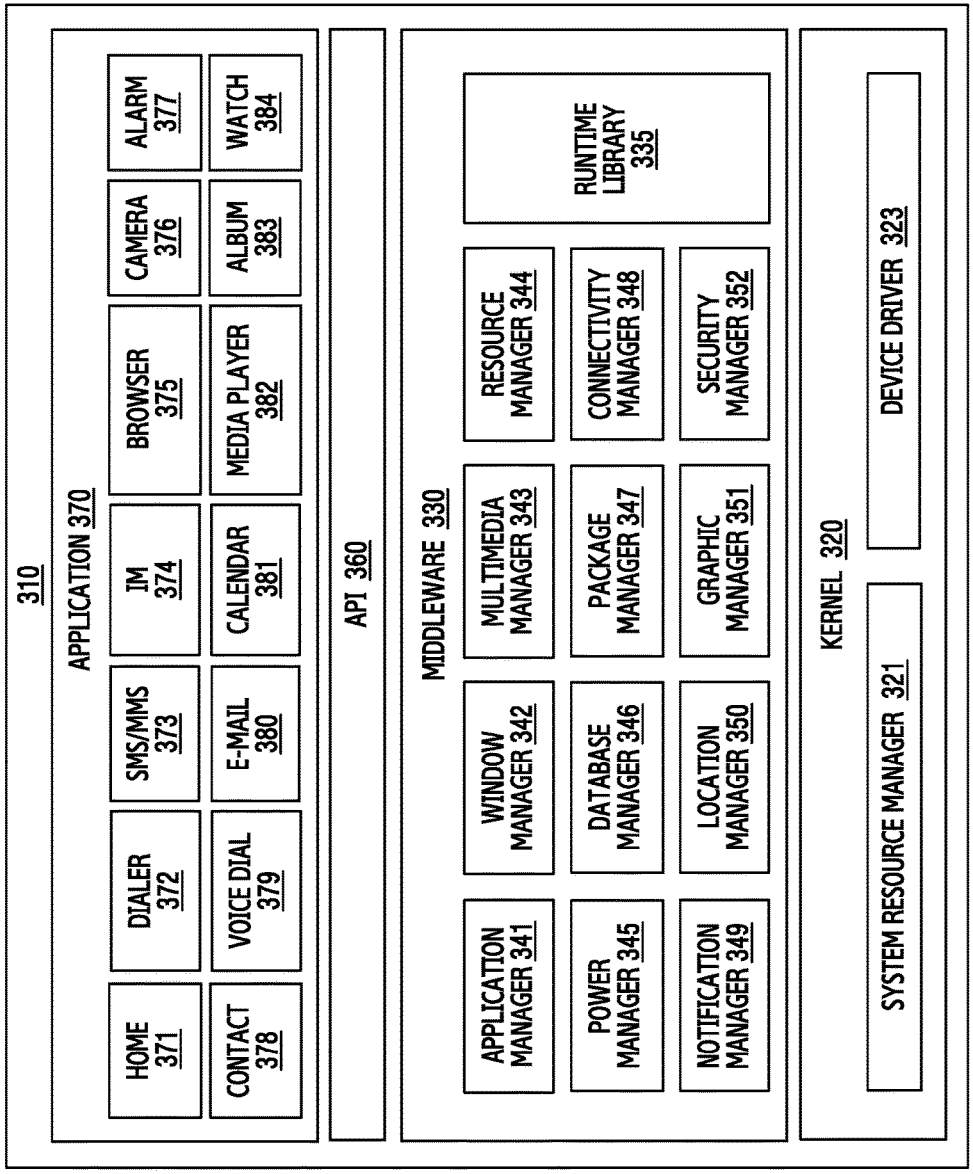
FIG. 3 is a block diagram illustrating an example program module according to various example embodiments of the present disclosure.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch (e.g., clock) 384 or the like. According to various example embodiments, the application 370 may include an application for providing a health care (e.g., for measuring exercise quantity or blood sugar, etc.), or environment information (e.g., providing atmospheric pressure, humidity, or temperature information), an authentication application for authenticating an electronic device, or the like.

According to an embodiment of the present disclosure, the applications 370 may include an application (hereinafter, referred to as an "information exchange application" (not shown) for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various example embodiments of the present disclosure disclose a method and an apparatus for connecting between electronic devices using authentication based on biometric information. According to various example embodiments, there are provided an apparatus and a method which control a connection between a first electronic device including a biometric sensor, and a second electronic device not including a biometric sensor, and provide information related to user authentication and required by the second electronic device via the first electronic device. According to various example embodiments, there are provided an apparatus and a method for triggering to start a communication connection in a first electronic device when connecting wireless communication between the first electronic device and a second electronic device. According to various example embodiments, there are provided an apparatus and a method which trigger to start a communication connection based on near field communication (NFC), and authenticate based on biometric information by connecting between electronic devices based on non-NFC (for example, Bluetooth, WiFi, light fidelity (LiFi), or the like).

According to various example embodiments of the present disclosure, an electronic device may include all devices which support a communication function and a biometric information sensing function, and use one or more of various processors such as, for example, and without limitation, a dedicated processor, an AP, a CP, a GPU, and a CPU. For example, an electronic device according to various example embodiments may include all information communication devices, multimedia devices, wearable devices, Internet of Thing (IoT) devices, or application devices therefor, which support a communication function and a biometric information sensing function.

Hereinafter, an operating method and an apparatus according to various example embodiments of the present disclosure will be described with reference to the accompanying drawings. However, since various example embodiments of the present disclosure are not restricted or limited by the following description, it should be noted that the present disclosure can be applied to various example embodiments based on the following embodiments. In various example embodiments described below, a hardware approach method will be described by way of an example. However, since various example embodiments of the present disclosure include technology which use both hardware and software, various example embodiments of the present disclosure do not exclude an approach method based on software.

Figure 4:
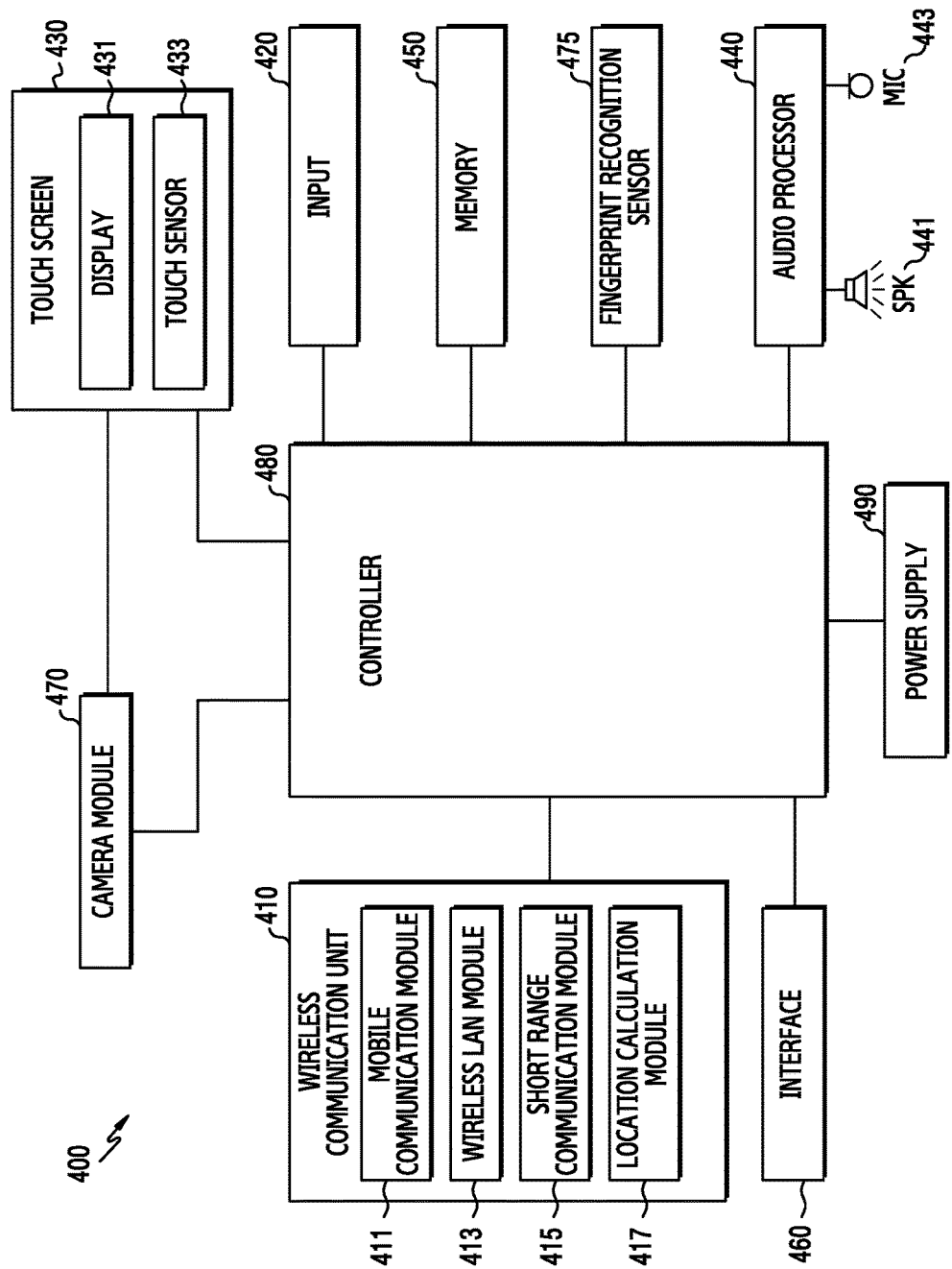
FIG. 4 is a block diagram illustrating an example configuration of an electronic device according to various example embodiments of the present disclosure.

FIG. 4 is a block diagram illustrating an example configuration of an electronic device according to various example embodiments of the present disclosure.

Referring to FIG. 4, an electronic device 400 according to various example embodiments of the present disclosure may include a wireless communication unit (e.g., including various wireless communication circuitry) 410, an input (e.g., including input circuitry) 420, a touch screen 430, an audio processor 440, a memory 450, an interface (e.g., including interface circuitry) 460, a camera module 470, a fingerprint recognition sensor 475, a controller (e.g., including processing circuitry) 480 (for example, the processor 120 including processing circuitry), and a power supply 490. According to various example embodiments of the present disclosure, the elements of the electronic device 400 illustrated in FIG. 4 are not essential and the electronic device 400 may include more elements than in FIG. 4 or may include fewer elements than in FIG. 4.

For example, the wireless communication unit 410 may have the same or similar configuration as or to that of the communication module 220 of FIG. 2. The wireless communication unit 410 may include one or more modules for enabling wireless communication to be performed between the electronic device 400 and another external device (for example, another electronic device 102, 104 or the server 106). For example, the wireless communication unit 410 may include various wireless communication circuitry, such as, for example, and without limitation, a mobile communication module 411, a wireless local area network (WLAN) module 413, a short range communication module 415, and a location calculation module 417. According to various example embodiments, the wireless communication unit 410 may include a module (for example, a short range communication module, a long range communication module, or the like) for communicating with a neighboring external device.

For example, the mobile communication module 411 may have the same or similar configuration as or to that of the cellular module 221 of FIG. 2. The mobile communication module 411 may transmit and receive radio signals to and from at least one of a base station, an external electronic device (for example, another electronic device 104), and various servers (for example, an application server, a management server, an integration server, a provider server, a content server, an internet server, a cloud server, or the like) on a mobile communication network. The radio signal may include a voice signal, a data signal, or various types of control signals. The mobile communication module 411 may transmit various data necessary for the operations of the electronic device 400 to an external electronic device (for example, the server 106 or another electronic device 104) in response to a user request.

For example, the wireless LAN module 413 may have the same or similar configuration as or to that of the WiFi module 223 of FIG. 2. The wireless LAN module 413 may indicate a module for wirelessly accessing the Internet and forming a wireless LAN link with another external device (for example, another electronic device 102 or the server 106). The wireless LAN module 413 may be embedded inside or provided outside the electronic device 400. Wireless Internet technology may use WiFi, Wibro, world interoperability for microwave access (WiMax), high speed downlink packet access (HSDPA), or millimeter wave (mm-Wave). The wireless LAN module 413 may transmit or receive various data of the electronic device 400 to or from the outside by being directly connected with another electronic device or interworking with another external device (for example, another electronic device 104 or the like) which is connected with the electronic device 400 via a network (for example, a wireless Internet network) (for example, the network 162). The wireless LAN module 413 may always maintain an on state or may be turned on according to setting of the electronic device 400 or a user input.

The short range communication module 415 may indicate a module for performing short range communication. The short range communication technology may use Bluetooth, Bluetooth low energy (BLE), radio frequency identification (RFID), an infrared data association (IrDA), ultra wideband (UWB), Zigbee, NFC, or the like. The short range communication module 415 may transmit or receive various data of the electronic device 400 to or from an external device by interworking with another external device (for example, another electronic device 102 or the like) connected with the electronic device 400 via a network (for example, a short range communication network). The short range communication module 415 may always maintain an on state or may be turned on according to setting of the electronic device 400 or a user input. According to various example embodiments, the short range communication module 415 may receive a user input (for example, NFC tagging) for initiating an operation related to use of the electronic device 400 (for example, an operation of connecting communication with another electronic device), and may generate an input signal according to a user input.

For example, the location calculation module 417 may have the same or similar configuration as or to that of the GNSS module 227 of FIG. 2. The location calculation module 417 is a module for acquiring the location of the electronic device 400, and may include a global positioning system (GPS) module as a representative example. The location calculation module 417 may measure the location of the electronic device 400 according to the principle of triangulation.

The input 420 may include various input circuitry configured to generate input data for controlling the operations of the electronic device 400 in response to an input. The input 420 may include at least one input device for detecting user's various inputs. For example, the input 420 may include various input circuitry, such as, for example, and without limitation, a keypad, a dome switch, a physical button, a touch pad (resistive/capacitive), a jog & shuttle, and a sensor (for example, the sensor module 240).

The input 420 may include various input circuitry and have a part thereof implemented on the outside of the electronic device 400 in the form of, for example, a button, or a part or entirety of the input 420 may be implemented, for example, in the form of a touch panel. The input 420 may receive an input for initiating the operations of the electronic device 400 (for example, a photographing function, a data generating function, a data reproducing function, or the like) according to various example embodiments, and generate an input signal according to an input.

The touch screen 430 may include an input and output device for performing an input function and a display function simultaneously, and may include a display 431 (for example, the display 160, 260) and a touch sensor 433. The touch screen 430 may provide an input and output interface between the electronic device 400 and the user, and may include a mediatory role of delivering a user's touch input to the electronic device 400 and displaying an output from the electronic device 400 for the user. The touch screen 430 may display a visual output for the user. The visual output may be displayed in the form of a text, graphics, a video, and a combination of these. According to various example embodiments, the touch screen 430 may include a fingerprint recognition area corresponding to a location in which the fingerprint recognition sensor 475 is embedded, and may receive an input for recognizing a fingerprint (for example, a first input) and an input by the user for executing a function (for example, a second input) through at least a part of the fingerprint recognition area in a fingerprint recognition mode.

The display 431 may display (output) a variety of information processed in the electronic device 400. For example, the display 431 may display a user interface (UI) or a graphic user interface (GUI) related to an operation of connecting with another electronic device, an operation of displaying a guide related to a connection with another electronic device, an operation of authenticating a user, or an operation of providing a result of user authentication. The display 431 may use various displays (for example, the display 160). According to various example embodiments, the display 431 may use a bended display.

The touch sensor 433 may be seated in the display 431, and may sense a user input which touches or approaches the surface of the touch screen 430. The user input may include a touch input or an approach input which is inputted based on at least one of a single touch, a multi-touch, hovering, or an air gesture. According to various example embodiments, the touch sensor 433 may receive a user input for initiating an operation related to the use of the electronic device 400 (for example, an operation of connecting communication with another electronic device), and generate an input signal according to a user input.

According to various example embodiments, the touch sensor 433 may be configured to convert a change in a pressure applied to a specific portion of the display 431 or a change in capacitance generated in a specific portion of the display 431 into an electric input signal. The touch sensor 433 may detect a location and an area of an input tool (for example, a user finger, an electronic pen, or the like) on the surface of the display 431 when the input tool touches or approaches the surface of the display 431. In addition, the touch sensor 433 may be implemented to detect a pressure (for example, a force touch) when a touch is inputted in an applied touch method.

For example, the audio processor 440 may have the same or similar configuration as or to that of the audio module 280 of FIG. 2. The audio processor 440 may transmit an audio signal inputted from the controller 480 to a speaker (SPK) 441, and may forward an audio signal inputted from a microphone (MIC) 443, such as a voice, to the controller 480. The audio processor 440 may convert voice/sound data into an audible sound via the speaker 441 under the control of the controller 480, and output the audible sound, and may convert an audio signal received from the microphone 443 such as a voice into a digital signal, and forward the digital signal to the controller 480.

The speaker 441 may output audio data which is received from the wireless communication unit 410 or stored in the memory 450. The speaker 441 may output sound signals related to various operations (functions) performed in the electronic device 400.

The microphone 443 may receive a sound signal from the outside and process the sound signal into electric voice data. In the microphone 443, various noise reduction algorithms for removing a noise generated in the process of receiving a sound signal from the outside may be implemented. The microphone 443 may be in charge of inputting audio streaming such as a voice command (for example, a voice command for connecting communication or initiating a function of setting/registering user information (for example, biometric information)).

The memory 450 (for example, the memory 130, 230) may store one or more programs which are executed by the controller 480, and may perform a function of temporarily storing (for example, buffering) inputted/outputted data. For example, the inputted/outputted data may include a video, an image, a photo, an audio, user information (for example, account information, approval information, or biometric information (for example, fingerprint information, iris information, or the like)), or random data/singed data related to data encryption. According to various example embodiments, the memory 450 may store at least one piece of biometric information (for example, a fingerprint image, an iris image, or the like) related to user authentication. The memory 450 may be in charge of storing acquired data, and may store data acquired on a real time basis in a temporary storage device (for example, a buffer) and may store data which is determined to be stored in a storage device which can store for long time.

According to various example embodiments, the memory 450 may store one or more programs, data, or instructions related to operations of the controller 480 (for example, a processor): acquiring connection information related to a connection with an external device from an NFC tag in response to NFC tagging; and forming a communication connection with the external device via a communication circuit (for example, the wireless communication unit 410) based on the acquired connection information.

According to various example embodiments, the memory 450 may store one or more programs, data, or instructions related to the operations of the controller 480 (for example, a processor): receiving an authentication information request from an external device in response to a communication connection with the external device; acquiring biometric information related to user authentication through a biometric sensor (for example, the fingerprint recognition sensor 475) in response to the authentication information request; generating control data corresponding to authentication information requested by the external device based on the acquired biometric information; and transmitting the generated control data to the external device.

The memory 450 may include one or more application modules (or software modules). The memory 450 may include a computer readable recording medium which has a program recorded thereon, for executing the method according to various example embodiments in a processor (for example, the controller 480).

According to various example embodiments, the computer readable recording medium may include a computer readable recording medium which has a program recorded thereon, for executing the operations of: in response to NFC tagging between the electronic device 400 and an external device 500 (see, e.g., FIG. 5), acquiring connection information related to a connection with the external device 500 from the external device 500; establishing a communication connection with the external device 500 based on at least the connection information; receiving a request for authentication information from the external device 500 in response to the communication connection being established; acquiring biometric information corresponding to a user of the electronic device 400 using a biometric sensor (for example, the biometric sensor 240I or the fingerprint recognition sensor 475) in response to the request; authenticating the user based on at least the biometric information; when the authenticating succeeds, generating second authentication information based on at least the first authentication information; and transmitting the second authentication information to the external device 500.

According to various example embodiments, the computer readable recording medium may include a computer readable recording medium which has a program recorded thereon, for executing an operation of generating the second authentication information by encrypting the first authentication information based on at least a key value which is pre-stored in the electronic device.

According to various example embodiments, the computer readable recording medium may include a computer readable recording medium which has a program recorded thereon, for executing the operations of: determining a type of the request for the authentication information; and generating the second authentication information according to the determined type.

The interface 460 may have the same or similar configuration as or to that of the interface 270 of FIG. 2, for example. The interface 460 may receive data from another electronic device or receive power, and may forward data or power to the elements in the electronic device 400. The interface 460 may control internal data of the electronic device 400 to be transmitted to another electronic device. For example, the interface 460 may include a wire/wireless headphone port, an external charger port, a wire/wireless data port, a memory card port, an audio input/output port, a video input/output port, an earphone port, or the like.

The fingerprint recognition sensor 475 may be a sensor for recognizing a user's fingerprint. The fingerprint recognition sensor 475 may be disposed on the front surface of the electronic device 400 on which the display 431 of the electronic device 400 is disposed, and may be mounted on a part of an area close to the display 431. The fingerprint recognition sensor 475 may be mounted in the touch screen 430 or a physical key (for example, a home button) to recognize a fingerprint inputted by the user. According to various example embodiments, the fingerprint recognition sensor 475 is illustrated as an example of a biometric sensor for acquiring user's biometric information, but the sensor may additionally or alternatively include another sensor (for example, an iris scan sensor) for sensing user's unique characteristic information.

The camera module 470 (for example, the camera module 291) indicates a configuration for supporting a photographing function of the electronic device 400. The camera module 470 may photograph a certain subject according to control of the controller 480 and may forward photographed data (for example, an image) to the display 431 and the controller 480.

According to various example embodiments, the camera module 470 may include a first camera (for example, a color (RGB) camera) for acquiring color information, and a second camera (for example, an infrared (IR) camera) for acquiring depth information (for example, location information or distance information of a subject). According to an example embodiment, the first camera may be a front camera which is provided on the front surface of the electronic device 400. According to various example embodiments, the front camera may be substituted with the second camera and the first camera may not be provided on the front surface of the electronic device 400. According to various example embodiments, the first camera may be disposed on the front surface of the electronic device 400 with the second camera. According to an example embodiment, the first camera may be a rear camera which is provided on the rear surface of the electronic device 400. According to an example embodiment, the first camera may include both the front camera and the rear camera which are provided on the front surface and the rear surface of the electronic device 400.

The camera module 470 may include an image sensor. The image sensor may be implemented by using a charged coupled device (CCD) or a complementary metal-oxide semiconductor (CMOS).

The controller 480 (for example, a processor or a control circuit) may include various processing circuitry configured to control an overall operation of the electronic device 400. According to various example embodiments, the controller

480 may have the same or similar configuration as or to that of the processor 210 of FIG. 2.

According to various example embodiments, the controller 480 may process an operation of acquiring connection information related to a connection with an external device from the external device using a first communication circuit (for example, the short range communication module 415, the NFC module 228 of FIG. 2), which supports NFC, in response to NFC tagging between the electronic device 400 and the external device. According to various example embodiments, the controller 480 may process an operation of establishing a communication connection with the external device based on at least the connection information using a second communication circuit (for example, the wireless LAN module 413, the short range communication module 415, the WiFi module 223 of FIG. 2, or the BT module 225 of FIG. 2), which supports non-NFC, and an operation of receiving a request for authentication information from the external device in response to the communication connection being established.

According to various example embodiments, the controller 480 may process an operation of acquiring biometric information corresponding to the user of the electronic device 400 using a biometric sensor (for example, the fingerprint recognition sensor 417, the biometric sensor 240I of FIG. 2) in response to the request for the authentication information; and an operation of authenticating the user based on at least the biometric information. According to various example embodiments, the controller 480 may process an operation of generating second authentication information based on at least first authentication information (for example, random data generated by the external device) when the authenticating succeeds, and an operation of transmitting the second authentication information to the external device.

According to various example embodiments, the controller 480 may process an operation of acquiring connection information related to a connection with an external device from an NFC tag in response to NFC tagging, and an operation of forming a communication connection with the external device based on the acquired connection information. According to various example embodiments, the controller 480 may determine the NFC tagging as triggering to start connecting communication with the external device.

According to various example embodiments, the controller 480 may process: an operation of receiving an authentication information request from the external device in response to a communication connection with the external device; an operation of acquiring biometric information related to user authentication through a biometric sensor (for example, the fingerprint recognition sensor 475) in response to the authentication information request; an operation of generating control data corresponding to the authentication information requested in the external device based on the acquired biometric information; and an operation of transmitting the generated control data to the external device.

The controller 480 may include one or more processors for controlling the operations of the electronic device 400. According to various example embodiments, the controller 480 may control the operations of hardware modules such as the audio processor 440, the interface 460, the display 431, the camera module 470, or the like. The controlling operation of the controller 480 according to various example embodiments of the present disclosure will be described in detail with reference to the drawings which will be described below. According to various example embodiments of the present disclosure, the controller 480 may be implemented by using one or more processors for controlling the operations of the electronic device 400 according to various example embodiments of the present disclosure by executing one or more programs stored in the memory 450.

The power supply 490 may receive external power or internal power under the control of the controller 480, and may supply power necessary for the operation of each element. According to various example embodiments of the present disclosure, the power supply 490 may supply power to or shut off the power supply to the wireless communication unit 410, the display 431, the camera module 470, or the like under the control of the controller 480.

Figure 5:
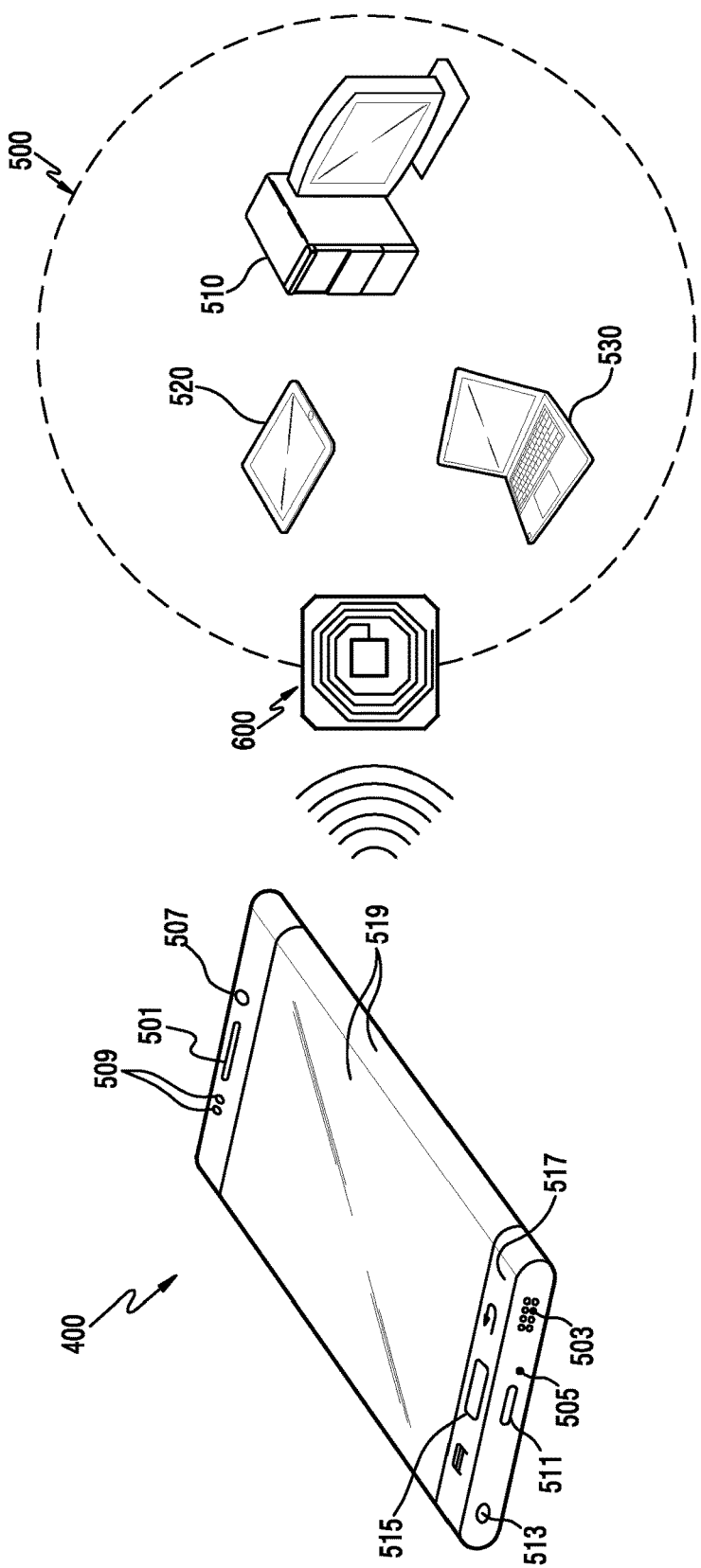
FIG. 5 is a diagram illustrating an example system according to various example embodiments of the present disclosure.

FIG. 5 is a diagram illustrating an example system according to various example embodiments of the present disclosure.

As illustrated in FIG. 5, the system according to various example embodiments of the present disclosure may include an electronic device 400 (for example, a first electronic device) and at least one external device 500 (for example, a second electronic device), and the external device 500 may include an NFC tag 600.

According to various example embodiments, the electronic device 400 may include a display 519, a housing (or a body) 517 in which the display 519 is seated and secured, and an additional device formed in the housing 517 to perform a function of the electronic device 400. According to various example embodiments, the additional device may include a first speaker 501, a second speaker 503, a microphone 505, a sensor (for example, a front camera 507, an illuminance sensor 509, or the like), a communication interface (for example, a charging or data input/output port 511, an audio input/output port 513), a button 515, or the like.

According to various example embodiments, the display 519 may include a flat display or a bended display which can be bent, crooked or rolled through a substrate which is thin and flexible like paper without being damaged. The bended display may be secured to the housing 517 and may maintain its bent shape. According to various example embodiments, the electronic device 400 may be implemented by using a display device which is free to be bent or unbent like a flexible display as well as the bended display. According to various example embodiments, the display 519 may give flexibility to be able to be folded or unfolded by substituting a plastic film for a glass substrate enclosing liquid crystals in a liquid crystal display (LCD), a light emitting diode (LED), an organic light emitting diode (OLED), or an active matrix OLED (AMOLED), or the like, but is not limited thereto.

According to various example embodiments, the electronic device 400 may recognize a user's fingerprint using the fingerprint recognition sensor 475. As a fingerprint recognition method of the electronic device 400, the electronic device 400 may have the fingerprint recognition sensor 475 embedded in a part of an electric or mechanical input device, and allows the user to use the electronic device 400 by authenticating the user based on a recognized fingerprint. For example, the electronic device 400 may have the fingerprint recognition sensor 475 embedded on a surface of a physical key (for example, a button 515 as a home key or a home button), which is a mechanical input device, and may support the user to experience various functions with the single physical key. In addition, the electronic device 400 may have the fingerprint recognition sensor 475 embedded in a touch screen (for example, the display 519), which is an electric input device.

The electronic device 400 may recognize a fingerprint in various methods. For example, the fingerprint recognition sensor 475 may use a swipe method which recognizes a fingerprint by scanning a finger from top to bottom or from bottom to top. Alternatively, the fingerprint recognition sensor 475 may use a method which scans an area touched by a finger and recognizes a fingerprint. According to an example embodiment, the user may perform fingerprint recognition by touching the physical key (for example, the button 515) or the display 519 having the fingerprint recognition sensor 475 embedded therein with a user's finger, or may perform fingerprint recognition by swiping a user's finger on the physical key (for example, the button 515) or the display 519.

According to an example embodiment, the fingerprint recognition sensor 475 may be implemented in an optical or semiconductor method. The optical method may be a method which flashes a light into a platen and recognizes an image of a fingerprint reflected according to the shape of a fingerprint of a fingertip placed on the platen. The semiconductor method may be a method which, when a fingertip is brought into contact with the surface of a chip, reads out a special shape of a fingerprint contacting the surface of the chip as an electric signal using an electric conduction characteristic of skin, that is, a method which uses a biometric characteristic. In addition, the fingerprint recognition sensor 475 may be configured in a touch sensor type. The touch sensor may have electrodes arranged at intervals which are smaller than a size and a gap of a valley and a ridge of a fingerprint. In addition to the optical or semiconductor method, the fingerprint recognition sensor 475 according to various example embodiments may acquire a fingerprint image in various methods such as an ultrasonic method, a heat detection method, a contactless method, or a combination of these methods.

According to an example embodiment, the fingerprint recognition sensor 475 may be implemented in a swipe type or a fixed area type. The swipe type is a method which drags a finger on the location of the fingerprint recognition sensor 475. In the swipe type method, sensor electrodes arranged in a one-dimensional pattern or linearly recognize the dragged finger (that is, a fingerprint) and then combines the recognized images into a two-dimensional fingerprint image through post-processing. The fixed area type is a method which obtains a two-dimensional fingerprint image while a finger is placed on sensors arranged in a two-dimensional pattern. The touch sensor for recognizing a fingerprint may have electrodes arranged in a one-dimensional or two-dimensional pattern.

According to various example embodiments, the fingerprint recognition sensor 475 may be mounted in a physical key (for example, the button 515) or the touch screen 430 (for example, the display 519), or may be disposed on a certain location of a bezel area (for example, the housing 517) of the touch screen 430 rather than the physical key or the touch screen 430. In addition, when the fingerprint recognition sensor 475 is a fingerprint sensor of a touch sensor type, the fingerprint recognition sensor 475 may be disposed on a certain location of the user inputter 420 which is disposed at the lower end of the touch screen 430.

According to various example embodiments, the fingerprint recognition sensor 475 may be disposed in the physical key (for example, the button 515) which is a mechanical input device, and may receive a touch or a pressing input from the user and forward related information to the controller 480 to perform a pre-designated function (for example, a first function for recognizing a fingerprint or a pre-set second function).

According to various example embodiments, the electronic device 400 may be connected with the external device 500. According to various example embodiments, the electronic device 400 may include a first communication circuit (for example, the short range communication module 415 of FIG. 4 or the NFC module 228 of FIG. 2) which supports NFC, and a second communication circuit (for example, the wireless LAN module 413 of FIG. 4, the short range communication module 415 of FIG. 4, the WiFi module 223 of FIG. 2, the BT module 225 of FIG. 2, or the like) which supports non-NFC. According to an example embodiment, the electronic device 400 may acquire connection information related to a connection with the external device 500 using the first communication circuit for the NFC. According to an example embodiment, the electronic device 400 may be connected with the external device 500 using the second communication circuit for the non-NFC based on the connection information. According to various example embodiments, the electronic device 400 may be connected with the external device 500 based on the non-NFC (for example, Bluetooth, BLE, WiFi, LiFi, or the like).

According to various example embodiments, the electronic device 400 may acquire connection information (for example, tag information) for connecting to the external device 500 from the NFC tag 600 mounted in the external device 500. The electronic device 400 may determine triggering for starting connecting communication with the external device 500 in response to the electronic device 400 being tagged to the NFC tag 600 of the external device 500 (for example, NFC tagging). According to an example embodiment, in response to the electronic device 400 being tagged to the NFC tag 600, the electronic device 400 may collect tag information from the NFC tag 600. According to various example embodiments, the tag information may include connection information for connecting communication with the external device 500. The connection information, which is information necessary for pairing with the external device 500, may include an address (for example, a MAC address) or a name of a Bluetooth device (for example, the external device 500).

According to various example embodiments, the electronic device 400 may automatically activate a Bluetooth function based on the NFC tag 600 even when the Bluetooth function is inactivated, and may operate to try to Bluetooth connect with a corresponding Bluetooth device (for example, the external device 500) based on the connection information acquired from the NFC tag 600. According to an example embodiment, the electronic device 400 may detect tagging to the NFC tag 600 as event triggering for Bluetooth connecting, and may automatically turn on Bluetooth to connect with the external device 500. According to an example embodiment, when the electronic device 400 is Bluetooth connected with the external device 500 and detects tagging to the NFC tag 600, the electronic device 400 may disconnect the Bluetooth connection.

According to various example embodiments, the electronic device 400 may connect wireless communication with the external device 500, and receive an authentication information request from the external device 500. The electronic device 400 may acquire biometric information related to user authentication from the user in response to the authentication information request of the external device 500. According to an example embodiment, the electronic device 400 may acquire user's fingerprint information through the fingerprint recognition sensor 475, and may transmit user information corresponding to the authentication information request of the external device 500 to the external device 500 based on the acquired fingerprint information. According to various example embodiments, the user information transmitted to the external device 500 may be encrypted data which includes the acquired biometric information (for example, fingerprint information) and is encrypted, or may be encrypted data which does not include the acquired biometric information (for example, fingerprint information) and includes only the result of authenticating and is encrypted. According to various example embodiments, the electronic device 400 may provide user information based on fingerprint information or user information based on the result of authenticating to the external device 500 based on at least a part of the type of the authentication information request (for example, a security level) requested by the external device 500.

Hereinafter, various example embodiments related to the electronic device 400 connecting communication with the external device 500 by interworking with the external device 500, and accordingly, providing user information will be described in detail with reference to the drawings which will be described below.

According to various example embodiments, the NFC tag 600 is a device which communicates with the electronic device 400, and for example, may perform NFC, which is one example of short range communication, with the external device 400. According to various example embodiments, it is assumed that the NFC tag 600 performs short range wireless communication with the electronic device 400, but, for example, the NFC tag 600 may be configured as a tag enabled to communicate only when being brought into contact with the electronic device 400.

According to various example embodiments, the external device 500 may include various devices which can connect with the electronic device 400 via wireless communication. For example, the external device 500 may include a desktop PC 510 (hereinafter, referred to as a computer), a tablet PC 520, or a laptop PC 530 (notebook), or the like but is not limited thereto. According to various example embodiments, the external device 500 may have a similar configuration to that of the above-described electronic device 400. For example, the external device 500 may not include the fingerprint recognition sensor 475 and may include a control circuit (or a processor) corresponding to the controller 480 of FIG. 4, and may be implemented to include more elements than the electronic device 400 illustrated in FIG. 4 or include fewer elements than the electronic device 400. In explaining various example embodiments, the external device 500 is illustrated as a computer.

According to various example embodiments, the external device 500 may have the NFC tag 600 mounted in a certain external area thereof, and may include a communication circuit (for example, a Bluetooth module) for connecting wireless communication (for example, Bluetooth communication) with the electronic device 400. According to various example embodiments, the external device 500 may indicate a device which does not include a separate device (for example, the fingerprint recognition sensor 475) for acquiring user's biometric information (for example, fingerprint information). According to various example embodiments, the external device 500 may include a virtual biometric authentication sensor driver. The virtual biometric authentication sensor driver may refer to software or a program which is installed in the external device 500 to support a communication connection with the electronic device 400 and process user information (for example, biometric information) based on the electronic device 400. According to various example embodiments, the virtual biometric authentication sensor driver may be implemented as hardware and may be included in the external device 500.

According to various example embodiments, the external device 500 may connect wireless communication in response to a connection request of the electronic device 400, and, when the wireless communication is connected, may request authentication information for authenticating in relation to the use of the electronic device 500 from the electronic device 400. The external device 500 may determine a security level based on at least a part of a use state or a non-use state of the external device 500, or user information necessary in the use state. The external device 500 may transmit an authentication information request including the determined security level to the electronic device 400. The external device 500 may receive user information corresponding to the authentication information request from the electronic device 400, and determine whether the user information is valid or not. When the received user information is valid, the external device 500 may process a corresponding operation. According to an example embodiment, when the external device 500 is booted in a lock state, the external device 500 may perform a logon operation based on the user information. According to an example embodiment, the external device 500 may input user information received in the use state (for example, in a state in which the external device 500 accesses a web site and is required to input user information to the web site) as information necessary in the use state.

Hereinafter, various example embodiments related to the external device 500 connecting communication with the electronic device 400 by interworking with the electronic device 400, and operating based on user information received accordingly will be described in detail with reference to the drawings which will be described below.

As described above, the electronic device 400 according to various example embodiments may include: a first communication circuit (for example, the wireless communication unit 410, the NFC module 228) configured to support NFC; a second communication circuit (for example, the wireless communication unit 410, the WiFi module 223, the BT module 225) configured to support non-NFC; a biometric sensor (for example, the biometric sensor 240I, the fingerprint recognition sensor 475); a memory (for example, the memory 450, the memory 230) configured to store first authentication information corresponding to an external device (for example, the external device 500, the second electronic device 500); and a processor (for example, the controller 480), and the processor may be configured to: acquire connection information related to a connection with the external device 500 from the external device 500 using the first communication circuit in response to NFC tagging between the electronic device (for example, the electronic device 400, the first electronic device 400) and the external device 500; establish a communication connection with the external device 500 using the second communication circuit based on at least the connection information; receive a request for authentication information from the external device 500 in response to the communication connection being established; acquire biometric information corresponding to a user of the electronic device 400 using the biometric sensor in response to the request; authenticate the user based on at least the biometric information; when the authenticating succeeds, generate second authentication information based on at least the first authentication information; and transmit the second authentication information to the external device 500.

According to various example embodiments, the second authentication information may be used by the external device to authenticate the user for the external device.

According to various example embodiments, the request may include the first authentication information which is generated by the external device.

According to various example embodiments, the first authentication information may include random data which is generated by the external device.

According to various example embodiments, the memory may be configured to store a key value, and the processor may be configured to generate the second authentication information by encrypting the first authentication information based on at least the key value.

According to various example embodiments, the processor may be configured to determine a type of the request for the authentication information; and generate first control data or second control data according to the determined type.

According to various example embodiments, the processor may be configured to determine a security level related to the requested authentication information based on the determined type, when the security level is a first security level, generate the first control data based on the random data, and, when the security level is a second security level, generate the second control data based on the random data and user information.

According to various example embodiments, the processor may be configured to include account information, approval information, or biometric information in the second control data as the user information based on user authentication based on the biometric information.

According to various example embodiments, the external device connected with the electronic device may be configured to determine a use state in response to communication being connected with the electronic device, determine a security level corresponding to the determined use state, and transmit the authentication information request corresponding to the determined security level to the electronic device, According to various example embodiments, the external device connected with the electronic device may be configured to: receive control data from the electronic device; decrypt the control data based on the key value of the electronic device which is pre-stored, and authenticate the electronic device; and perform an operation related to a function of the external device or an operation related to a user information input based on at least a part of the control data or the use state.

As described above, the electronic device 400 according to various example embodiments of the present disclosure may include: a communication circuit (for example, the wireless communication unit 410); a biometric sensor (for example, the fingerprint recognition sensor 475); and a processor (for example, the controller 480) functionally connected with the communication circuit and the biometric sensor. The processor may be configured to: acquire connection information related to a connection with the external device (for example, the second electronic device 500) from the NFC tag 600 in response to NFC tagging; form a communication connection with the external device 500 through the communication circuit based on the acquired connection information; receive an authentication information request from the external device 500 in response to the communication connection; acquire biometric information related to user authentication through the biometric sensor in response to the authentication information request; generate control data corresponding to the authentication information requested by the external device 500 based on the acquired biometric information, and transmit the generated control data to the external device 500.

According to various example embodiments, the processor may be configured to determine triggering for starting connecting communication with the external device in response to the NFC tagging.

According to various example embodiments, the connection information may be information for the electronic device to connect communication with the external device, and may be configured to include an address of the external device and a name of the external device.

According to various example embodiments, the authentication information request of the external device may be configured to include random data which is randomly generated by the external device.

According to various example embodiments, when the user authentication is completed based on the biometric information, the processor may be configured to generate the control data by encrypting the random data based on a pre-stored private key.

According to various example embodiments, the processor may be configured to determine the type of the authentication information request and generate first control data or second control data according to the determined type.

According to various example embodiments, the processor may be configured to determine a security level related to the requested authentication information based on the determined type, generate the first control data based on the random data when the security level is a first security level, and generate the second control data based on the random data and user information when the security level is a second security level.

According to various example embodiments, the processor may be configured to include account information, approval information, or biometric information in the second control data as the user information based on user authentication based on the biometric information.

According to various example embodiments, the external device 500 connected with the electronic device 400 may be configured to determine a use state in response to the communication connection with the electronic device 400, determine a security level corresponding to the determined use state, and transmit an authentication information request corresponding to the determined security level to the electronic device 400.

According to various example embodiments, the external device 500 connected with the electronic device 400 may be configured to receive control data from the electronic device 400, decrypt the control data based on a public key of the electronic device 400 which is pre-stored, and authenticate the electronic device 400, and perform an operation related to a function of the external device 500 or an operation related to a user information input based on at least a part of the control data or the use state.

Hereinafter, various example embodiments related to operations of connecting communication and transmitting and receiving user information between electronic devices in a system according to various example embodiments, and operating based on the result will be described. In the following description, a first electronic device indicates a device (for example, the electronic device 400) including a biometric sensor (hereinafter, referred to as the fingerprint recognition sensor 475) for recognizing user's biometric information (hereinafter, referred to as fingerprint information), and a second electronic device 500 indicates a device (for example, the external device 500) to be authenticated, which has a virtual biometric authentication sensor driver installed therein, is connected with the first electronic device, and operates based on user authentication based on the first electronic device.

Figure 6:
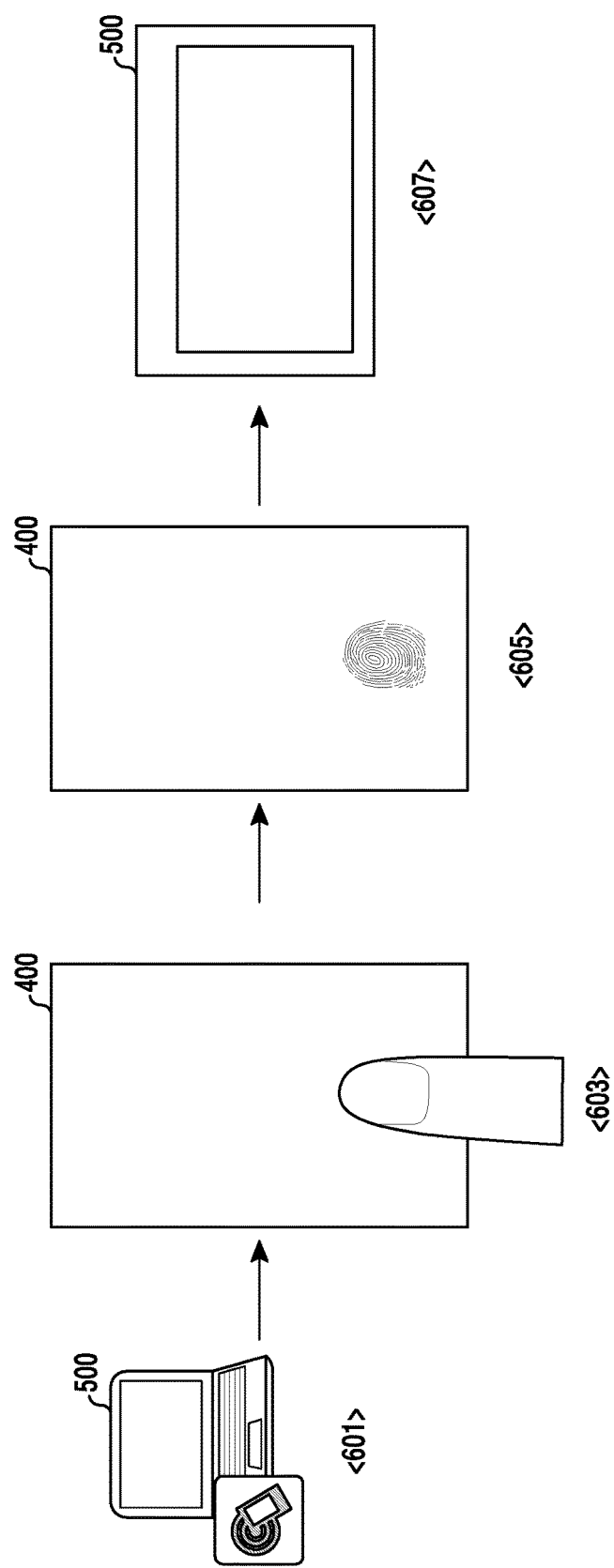
FIG. 6 is a diagram illustrating an example operation of connecting between electronic devices in a system according to various example embodiments of the present disclosure.

FIG. 6 is a diagram illustrating an example operation of connecting between electronic devices in a system according to various example embodiments of the present disclosure.

Referring to FIG. 6, in operation 601, the first electronic device 400 and the second electronic device 500 may be tagged to each other by a user. According to an example embodiment, the user may bring the first electronic device 400 close to or into contact with the NFC tag 600 attached to (mounted in) the second electronic device 500 to cause event triggering between the first electronic device 400 and the second electronic device 500.

The first electronic device 400 and the second electronic device 500 may determine the event triggering according to NFC tagging, and connect wireless communication (for example, Bluetooth communication) between the first electronic device 400 and the second electronic device 500. When the wireless communication with the first electronic device 400 is connected, the second electronic device 500 may transmit an authentication information request to the first electronic device 400 via the connected wireless communication.

In operation 603, after the wireless communication with the second electronic device 500 is connected, the first electronic device 400 may receive the authentication information request from the second electronic device 500 via the connected wireless communication. When the authentication information request is received, the first electronic device 400 may listen to a fingerprint information input from the user. The first electronic device 400 may output a related interface (for example, a GUI or a UI) for acquiring user's fingerprint information as a set sound, or may display a related guide. The user may input a user fingerprint through the display 431 or the button 515 including the fingerprint recognition sensor 475 of the first electronic device 400. According to an example embodiment, the user may input the user fingerprint in a swipe type by dragging a user's finger on an area (for example, a certain area of the display 431 or the button 515) of the first electronic device 400 in which the fingerprint recognition sensor 475 is disposed, or may input the user fingerprint in a fixed area type by placing a user's finger on the area in which the fingerprint recognition sensor 475 is disposed during a predetermined time.

In operation 605, the first electronic device 400 may scan the user fingerprint based on the fingerprint recognition sensor 475, and may authenticate the user based on the scanned image. According to an example embodiment, the first electronic device 400 may acquire a fingerprint image from the image scanned through the fingerprint recognition sensor 475, and determine whether the acquired fingerprint image is valid or not. For example, the first electronic device 400 may extract a characteristic of the fingerprint image acquired through the fingerprint recognition sensor 475, and authenticate the user by comparing and/or matching the characteristic of the fingerprinting image with user's characteristic information (for example, fingerprint information) pre-registered at the memory 450 (for example, a database). According to various example embodiments, the fingerprint recognition sensor 475 may acquire the fingerprint image in various methods such as an optical method, a semiconductor element method for detecting capacitance or electrical conduction, an ultrasonic method, a heat detection method, a contactless method, or a combination of these methods. When the user authentication is completed, the first electronic device 400 may transmit the result of the authentication (for example, signed data, fingerprint data, or the like) to the second electronic device 500.

In operation 607, the second electronic device 500 may receive the result of the authentication from the first electronic device 400, and process a corresponding operation based on the result of the authentication. According to an example embodiment, the second electronic device 500 may perform a related operation according to a use state or a non-use state of the second electronic device 500, or user information necessary in the use state. For example, when the second electronic device 500 is booted in a lock state, the second electronic device 500 may perform a logon operation based on the user information. In another example, the second electronic device 500 may input user information which is received in the use state (for example, a state in which the second electronic device 500 accesses a web site and is required to input user information to the web site) as the information (for example, account (login) information, payment information, an electronic signature, user authentication or approval information, or the like) necessary in the use state.

Figure 7:
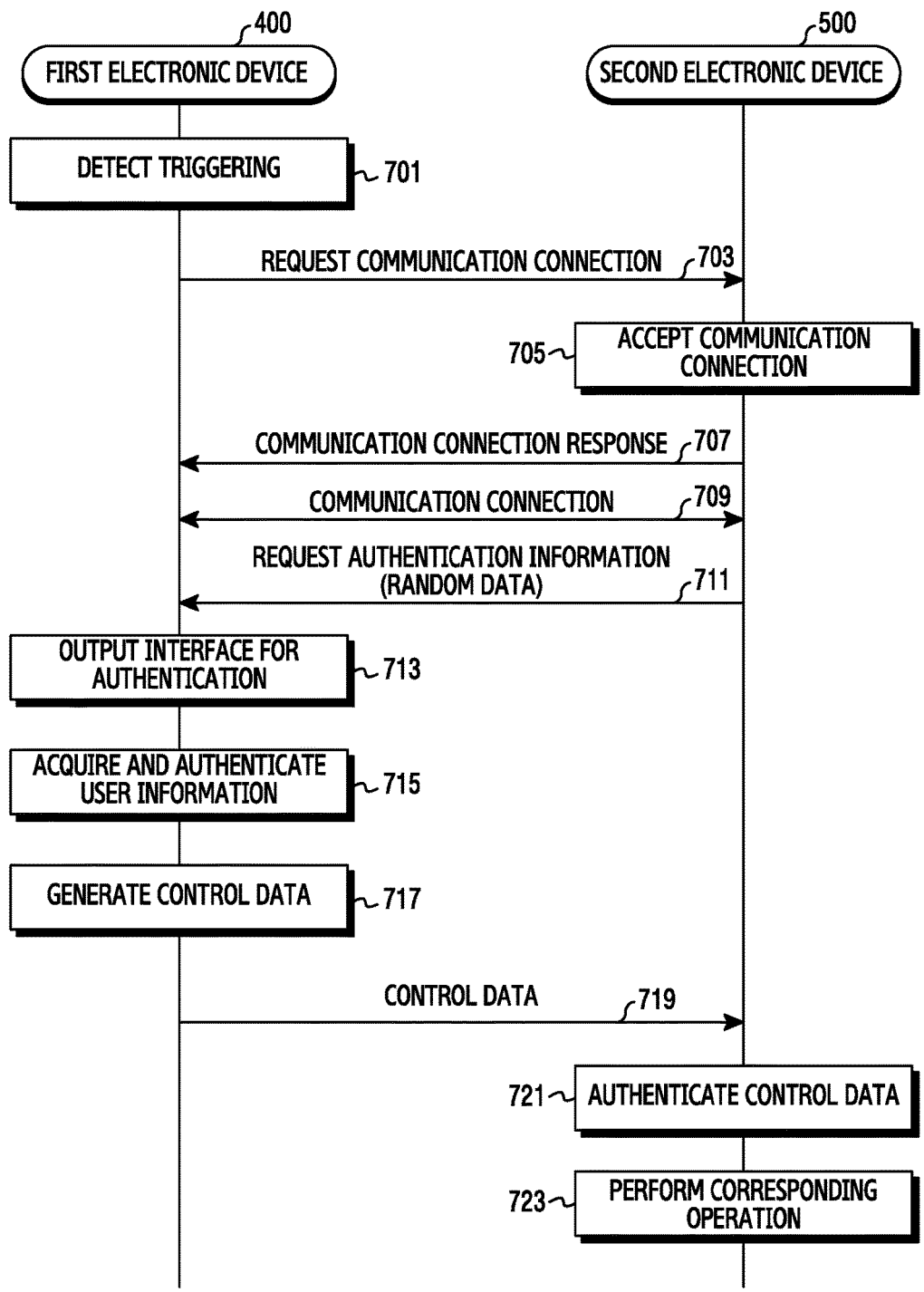
FIG. 7 is a signal flowchart illustrating example operations of connecting communication and transmitting and receiving authentication information between electronic devices in a system according to various example embodiments of the present disclosure.

FIG. 7 is a signal flowchart illustrating example operations of connecting communication and transmitting and receiving authentication information between electronic devices in a system according to various example embodiments of the present disclosure.

Referring to FIG. 7, in operation 701, the first electronic device 400 may detect triggering. For example, the first electronic device 400 may determine triggering for connecting wireless communication with the second electronic device 500 in response to NFC tagging as illustrated in FIG. 6 described above.

In operation 703, the first electronic device 400 may try to connect (e.g., request) communication with the second electronic device 500 in response to the triggering being detected. According to an example embodiment, the first electronic device 400 may transmit a communication connection request for connecting Bluetooth communication with the second electronic device 500 to the second electronic device 500. According to various example embodiments, the first electronic device 400 may acquire tag information from the NFC tag 600 according to NFC tagging, and acquire connection information related to the communication connection with the second electronic device 500 from the acquired tag information. The first electronic device 400 may try to connect communication with the second electronic device 500 based on the connection information. According to various example embodiments, the connection information may be information which is necessary for pairing with the second electronic device 500, and for example, may include an address (for example, a MAC address) or a name of a Bluetooth device (for example, the second electronic device 500).

In operation 705, when the communication connection request of the first electronic device 400 is received, the second electronic device 500 may accept the communication connection in response to the communication connection request. According to various example embodiments, the second electronic device 500 may listen to a communication connection of the first electronic device 400 through a virtual biometric authentication sensor driver, and, when receiving the communication connection request from the first electronic device 400 while listening to the communication connection, the second electronic device 500 may accept the communication connection.

In operation 707, the second electronic device 500 may transmit a communication connection response to the first electronic device 400 in response to the communication connection request.

In operation 709, the first electronic device 400 and the second electronic device 500 may establish a communication connection. According to an example embodiment, the first electronic device 400 and the second electronic device 500 may connect Bluetooth communication.

In operation 711, the second electronic device 500 may transmit an authentication information request to the first electronic device 400. According to various example embodiments, when the communication connection with the first electronic device 400 is established, the second electronic device 500 may request authentication information related to user authentication from the first electronic device 400. According to an example embodiment, the second electronic device 500 may include random data in the authentication information request and transmit the authentication information request. According to various example embodiments, the random data may include random data (for example, a challenge or a random number) which is randomly generated in the second electronic device 500 for authentication between the first electronic device 400 and the second electronic device 500.

In operation 713, when the authentication information request is received from the second electronic device 500, the first electronic device 400 may output a related interface (for example, a GUI or a UI) for authenticating the user. According to an example embodiment, the first electronic device 400 may output a related interface for acquiring user's fingerprint information, and listen to a fingerprint input by the user.

In operation 715, the first electronic device 400 may acquire user information and authenticate the acquired user information. For example, the first electronic device 400 may scan a user fingerprint based on the fingerprint recognition sensor 475, and authenticate the user based on the scanned image. According to an example embodiment, the first electronic device 400 may acquire a fingerprint image from the image scanned through the fingerprint recognition sensor 475, and determine whether the acquired fingerprint image is valid or not.

In operation 717, when the user authentication is completed (for example, when the user authentication is valid), the first electronic device 400 may generate control data including the result of the authentication (for example, signed data, fingerprint data, or the like). According to various example embodiments, the first electronic device 400 and the second electronic device 500 may register an encryption key which is agreed in advance by each other. For example, the first electronic device 400 may store a private key, and the second electronic device 500 may pre-register a public key of the first electronic device 400 corresponding to the private key.

According to an example embodiment, when the user authentication is completed, the first electronic device 400 may generate first control data (for example, data signed by the first electronic device 400) by encrypting the random data received from the second electronic device 500 using the private key of the first electronic device 400. According to another example embodiment, when the user authentication is completed, the first electronic device 400 may generate second control data (for example, signed data or fingerprint data) by encrypting the random data received from the second electronic device 500 and the user information (for example, fingerprint data) using the private key of the first electronic device 400. According to various example embodiments, the first electronic device 400 may generate the first control data or the second control data according to the type of the authentication information type of the second electronic device 500. These operations will be described in detail with reference to the drawings which will be described below.

In operation 719, the first electronic device 400 may transmit the control data to the second electronic device 500.

In operation 721, when the control data is received from the first electronic device 400, the second electronic device 500 may authenticate the control data. According to an example embodiment, the second electronic device 500 may decrypt the control data using the public key of the first electronic device 400 which is pre-stored. The second electronic device 500 may determine whether the decrypted control data is valid or not based on the random data transmitted to the first electronic device 400. For example, the second electronic device 500 may determine whether the result of the decryption (for example, the decrypted control data) is the same as the random data (for example, a challenge or a random number) transmitted from the second electronic device 500 to the first electronic device 400, and, when the result of the decryption is the same as the random data, the second electronic device 500 may authenticate the first electronic device 400. According to an example embodiment, when the first electronic device 400 provides the first control data, the second electronic device 500 may decrypt the first control data based on the public key, and authenticate the first control data by comparing the signed data of the first control data and the random data. According to an example embodiment, when the first electronic device 400 provides the second control data, the second electronic device 500 may decrypt the second control data based on the public key and authenticate the second control data by comparing the signed data of the second control data and the random data, and, when the second control data is normally authenticated, the second electronic device 500 may acquire fingerprint data of the second control data.

In operation 723, the second electronic device 500 may perform a corresponding operation based on the result of the authentication of the control data. According to an example embodiment, when the second electronic device 500 is booted in a lock state, the second electronic device 500 may perform a logon operation based on the result of the authentication of the first control data. In another example, the second electronic device 500 may input information (for example, login information, payment information, an electronic signature, user authentication or approval information, or the like) necessary in the use state using the user information which is acquired based on the result of the authentication of the first control data in the use state (for example, a state in which the second electronic device 500 accesses a web site and is required to input user information to the web site).

Figure 8:
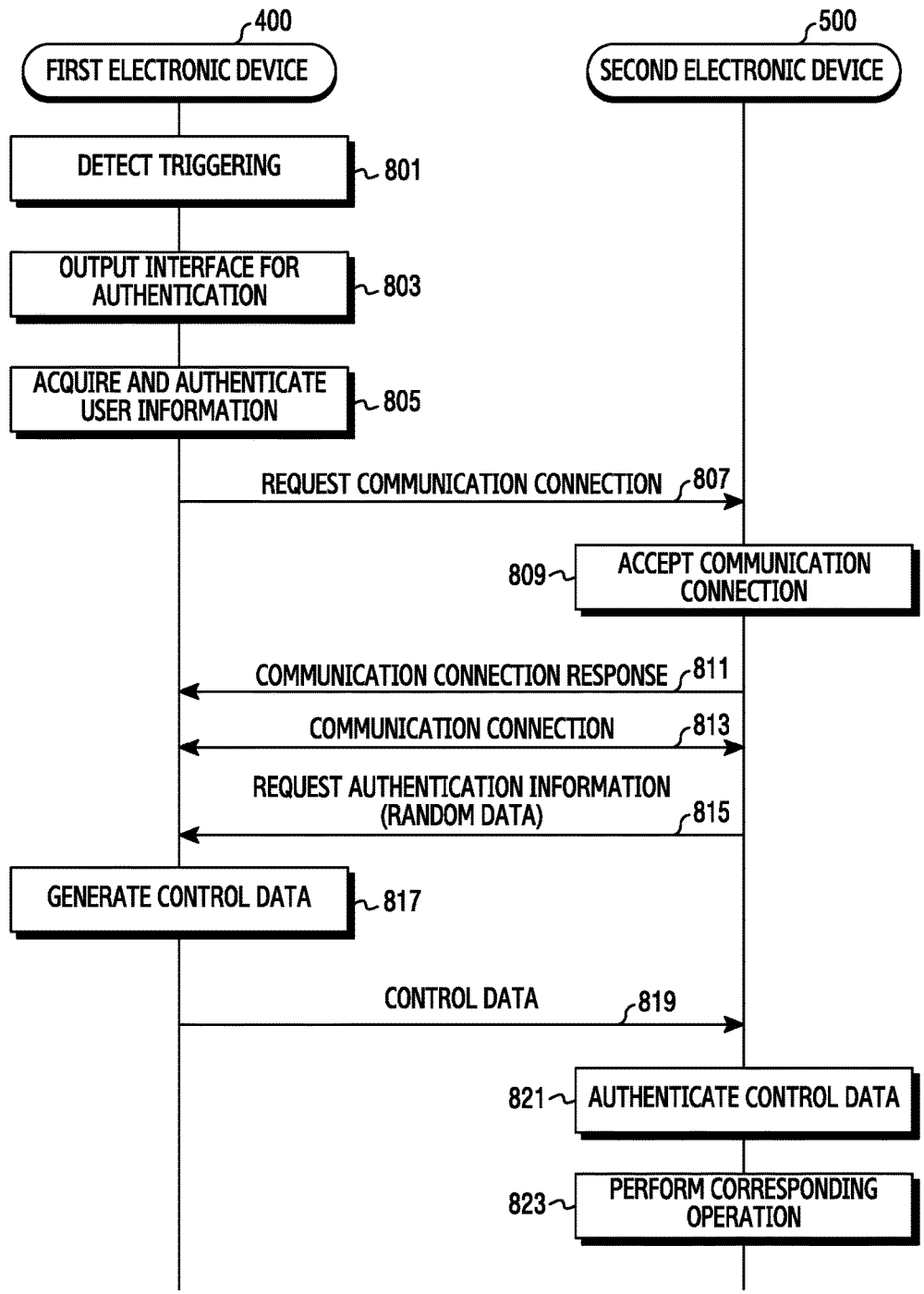
FIG. 8 is a signal flowchart illustrating example operations of connecting communication and transmitting and receiving authentication information between electronic devices in a system according to various example embodiments of the present disclosure.

FIG. 8 is a signal flowchart illustrating example operations of connecting communication and transmitting and receiving authentication information between electronic devices in a system according to various example embodiments.

Compared with FIG. 7, FIG. 8 illustrates that the operation of the first electronic device 400 acquiring user information precedes the operation of connecting with the second electronic device 500.

Referring to FIG. 8, in operation 801, the first electronic device 400 may detect triggering. For example, the first electronic device 400 may determine triggering for connecting wireless communication with the second electronic device 500 in response to NFC tagging as shown in FIG. 6 described above.

In operation 803, the first electronic device 400 may output a related interface (for example, a GUI or a UI) for authenticating the user in response to the triggering being detected. According to an example embodiment, the first electronic device 400 may output a related interface for acquiring user's fingerprint information, and may listen to a fingerprint input by the user.

In operation 805, the first electronic device 400 may acquire user information and authenticate the acquired user information. For example, the first electronic device 400 may scan a user fingerprint based on the fingerprint recognition sensor 475, and authenticate the user based on the scanned image. According to an example embodiment, the first electronic device 400 may acquire a fingerprint image from the image scanned through the fingerprint recognition sensor 475, and determine whether the acquired fingerprint image is valid or not.

In operation 807, when the user authentication is completed (for example, when the user authentication is valid), the first electronic device 400 may try to connect communication with the second electronic device 500 in response thereto. According to an example embodiment, the first electronic device 400 may transmit a communication connection request for connecting Bluetooth communication with the second electronic device 500 to the second electronic device 500. According to various example embodiments, the first electronic device 400 may acquire connection information related to a communication connection with the second electronic device 500 from the NFC tag 600 according to NFC tagging, and may try to connect communication with the second electronic device 500 based on the connection information. For example, the connection information may include an address (for example, a MAC address) or a name of the second electronic device 500.

In operation 809, when the communication connection request of the first electronic device 400 is received, the second electronic device 500 may accept the communication connection in response to the communication connection request. According to various example embodiments, the second electronic device 500 may listen to a communication connection of the first electronic device 400 through a virtual biometric authentication sensor driver, and, when receiving the communication connection request from the first electronic device 400 while listening to the communication connection, the second electronic device 500 may accept the communication connection.

In operation 811, the second electronic device 500 may transmit a communication connection response to the first electronic device 400 in response to the communication connection request.

In operation 813, the first electronic device 400 and the second electronic device 500 may establish a communication connection. According to an example embodiment, the first electronic device 400 and the second electronic device 500 may connect Bluetooth communication.

In operation 815, the second electronic device 500 may transmit an authentication information request to the first electronic device 400. According to various example embodiments, when the communication connection with the first electronic device 400 is established, the second electronic device 500 may request authentication information related to user authentication from the first electronic device 400. According to an example embodiment, the second electronic device 500 may include random data in the authentication information request and transmit the authentication information request. According to various example embodiments, the random data may include random data (for example, a challenge or a random number) which is randomly generated in the second electronic device 500 for authentication between the first electronic device 400 and the second electronic device 500.

In operation 817, when the authentication information request is received from the second electronic device 500, the first electronic device 400 may generate control data including the result of the authentication in operation 805 described above (for example, signed data, fingerprint data, or the like). According to an example embodiment, the first electronic device 400 may generate first control data (for example, signed data) by encrypting the random data received from the second electronic device 500 using a private key of the first electronic device 400. According to another example embodiment, the first electronic device 400 may generate second control data (for example, signed data or fingerprint data) by encrypting the random data received from the second electronic device 500 and the user information (for example, fingerprint data) using a private key of the first electronic device 400. According to various example embodiments, the first electronic device 400 may generate the first control data or the second control data according to the type of the authentication information type of the second electronic device 500. These operations will be described in detail with reference to the drawings which will be described below.

In operation 819, the first electronic device 400 may transmit the control data to the second electronic device 500.

In operation 821, when the control data is received from the first electronic device 400, the second electronic device 500 may authenticate the control data. According to an example embodiment, the second electronic device 500 may decrypt the control data using a public key of the first electronic device 400 which is pre-stored. The second electronic device 500 may determine whether the decrypted control data is valid or not based on the random data transmitted to the first electronic device 400. For example, the second electronic device 500 may determine whether the result of the decryption (for example, the decrypted control data) is the same as the random data (for example, a challenge or a random number) transmitted from the second electronic device 500 to the first electronic device 400, and, when the result of the decryption is the same as the random data, the second electronic device 500 may authenticate the first electronic device 400. According to an example embodiment, when the first electronic device 400 provides the first control data, the second electronic device 500 may decrypt the first control data based on the public key, and authenticate the first control data by comparing the signed data of the first control data and the random data. According to an example embodiment, when the first electronic device 400 provides the second control data, the second electronic device 500 may decrypt the second control data based on the public key and authenticate the second control data by comparing the signed data of the second control data and the random data, and, when the second control data is normally authenticated, the second electronic device 500 may acquire fingerprint data of the second control data.

In operation 823, the second electronic device 500 may perform a corresponding operation based on the result of the authentication of the control data. According to an example embodiment, when the second electronic device 500 is booted in a lock state, the second electronic device 500 may perform a logon operation based on the result of the authentication of the first control data. In another example, the second electronic device 500 may input information (for example, login information, payment information, an electronic signature, user authentication or approval information, or the like) necessary in the use state using the user information which is acquired based on the result of the authentication of the first control data in the use state (for example, a state in which the second electronic device 500 accesses a web site and is required to input user information to the web site).

Figure 9:
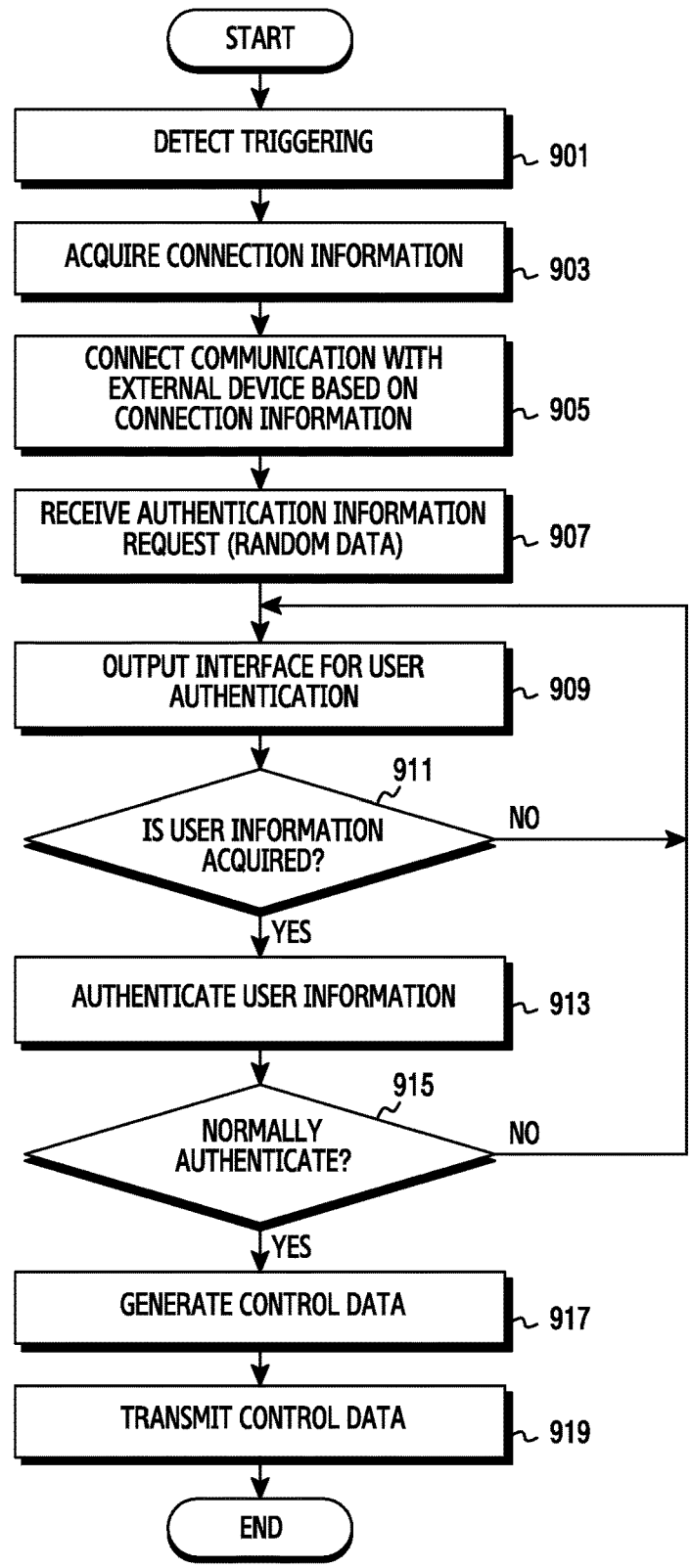
FIG. 9 is a flowchart illustrating an example method for connecting communication and providing authentication information in an electronic device according to various example embodiments of the present disclosure.

FIG. 9 is a flowchart illustrating an example method for connecting communication and providing authentication information in an electronic device according to various example embodiments of the present disclosure.

Referring to FIG. 9, in operation 901, the controller 480 (for example, a processor including processing circuitry) of the electronic device 400 may detect triggering. For example, the controller 480 may determine triggering for connecting wireless communication with an external device (for example, the second electronic device 500) in response to NFC tagging, that is, in response to the electronic device 400 being brought into contact with or close to the NFC tag 600.

In operation 903, the controller 480 may acquire connection information. For example, the controller 480 may acquire tag information from the NFC tag 600 according to NFC tagging, and acquire connection information related to a communication connection with the external device from the acquired tag information. According to various example embodiments, the connection information may be information which is necessary for pairing with the external device, and for example, may include an address (for example, a MAC address) or a name of a Bluetooth device.

In operation 905, the controller 480 may connect communication with the external device based on the connection information. For example, the controller 480 may try to connect communication with the external device based on the acquired connection information, and may connect wireless communication with the external device in response to a response of the external device.

In operation 907, the controller 480 may receive an authentication information request from the external device. According to various example embodiments, the authentication information request may include random data which is randomly generated by the external device.

In operation 909, the controller 480 may output a related interface for authenticating a user. According to an example embodiment, the controller 480 may output a related interface for acquiring user's fingerprint information, and may listen to a fingerprint input by the user. According to an example embodiment, the controller 480 may activate a fingerprint recognition mode in order for the user to input a fingerprint by means of the button 515 having the fingerprint recognition sensor 475 embedded therein. According to an example embodiment, the controller 480 may display an item (for example, a text, an icon, or the like) on a certain area of the display 431 having the fingerprint recognition sensor 475 embedded therein, for guiding a fingerprint input, and may activate the fingerprint recognition mode.

In operation 911, the controller 480 may determine whether user information is acquired or not. For example, the controller 480 may determine whether there is data (for example, scanned data) sensed through the fingerprint recognition sensor 475.

In operation 911, when the user information is not acquired (NO in operation 911), the controller 480 resumes operation 909 to process operations after operation 909. According to an example embodiment, the controller 480 may listen to a user input during a predetermined time, and, when there is no user input during the predetermined time, the controller 480 may finish performing operations.

In operation 911, when the user information is acquired (YES in operation 911), the controller 480 may authenticate the user information in operation 913. According to an example embodiment, the controller 480 may scan a user fingerprint based on the fingerprint recognition sensor 475 and may authenticate the user based on the scanned image. For example, the controller 480 may acquire a fingerprint image from the scanned image and compare the acquired fingerprint image and at least one fingerprint image which is pre-set by the user.

In operation 915, the controller 480 may determine whether the acquired user information is normally authenticated or not. For example, the controller 480 may determine whether the acquired fingerprint image is valid or not according to whether the acquired fingerprint image is consistent with the set fingerprint image.

In operation 915, when it is determined that the user information is not valid (NO in operation 915), the controller 480 resumes operation 909 to perform operations after operation 909. For example, when the acquired fingerprint image is not consistent with the set fingerprint image, the controller 480 may provide a guide (for example, output a user information inconsistency guide message, vibration feedback, or the like), and may receive user information again. According to an example embodiment, the controller 480 may authenticate the user information a predetermined number of times, and, when the controller 480 fails to authenticate the user information the predetermined number of times, the controller 480 may finish performing operations.

In operation 915, when it is determined that the user information is valid (YES in operation 915), the controller 480 may generate control data in operation 917. According to an example embodiment, the controller 480 may generate first control data (for example, signed data) by encrypting random data received from the external device using its own private key. According to another example embodiment, the controller 480 may generate second control data (for example, signed data, user information (for example, fingerprint data)) by encrypting the random data received from the external device and the user information (for example, fingerprint data, account information, approval information) using its own private key. According to various example embodiments, the controller 480 may generate the first control data or the second control data according to the type of the authentication information request of the external device.

In operation 919, the controller 480 may transmit the control data to the external device via the connected wireless communication.

According to various example embodiments, operations 909 to 915 related to user information may be performed after operation 901 of detecting triggering, and operation 905 of connecting communication may be performed after operations 909 to 915.

Figure 10:
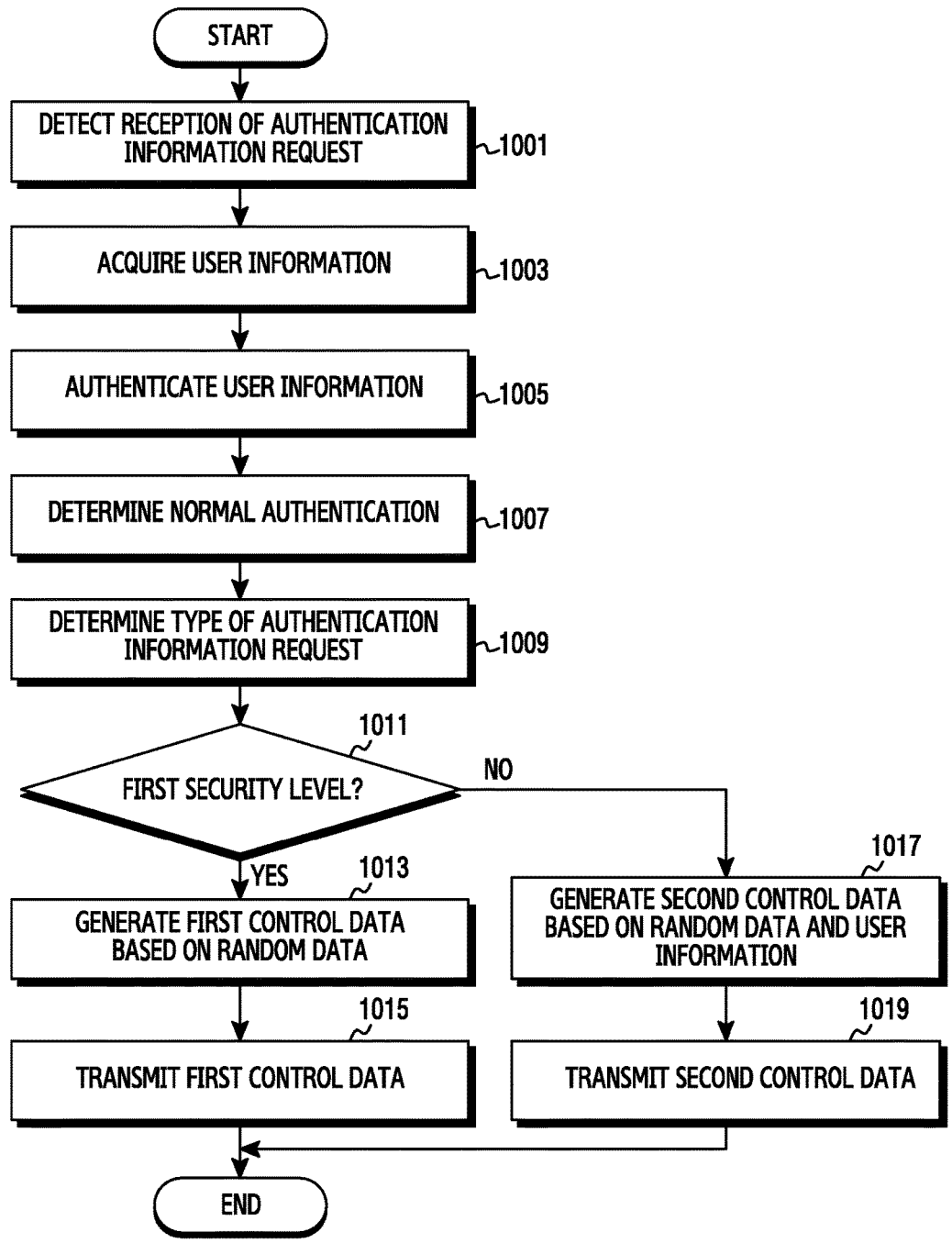
FIG. 10 is a flowchart illustrating an example method for providing authentication information in an electronic device according to various example embodiments of the present disclosure.

FIG. 10 is a flowchart illustrating an example method for providing authentication information in an electronic device according to various example embodiments of the present disclosure.

Referring to FIG. 10, in operation 1001, the controller 480 of the electronic device 400 may detect reception of an authentication information request. According to various example embodiments, the controller 480 may receive an authentication information request including random data and a security level from an external device with which wireless communication is connected (for example, a Bluetooth connection).

In operation 1003, the controller 480 may acquire user information in response to the authentication information request being received. According to an example embodiment, the controller 480 may acquire user information (for example, fingerprint information) based on a fingerprint sensor.

In operation 1005, the controller 480 may authenticate the acquired user information. According to an example embodiment, the controller 480 may scan a user fingerprint based on the fingerprint recognition sensor 475, and authenticate the user based on the scanned image. For example, the controller 480 may acquire a fingerprint image from the scanned image, and compare the acquired fingerprint image and at least one fingerprint image which is pre-set by the user.

In operation 1007, the controller 480 may determine whether the acquired fingerprint image is normally authenticated or not based on the acquired user information. For example, the controller 480 may determine whether the acquired fingerprint image is valid or not according to whether the acquired fingerprint image is consistent with the set fingerprint image.

In operation 1009, the controller 480 may determine the type of the authentication information request. For example, the controller 480 may determine a security level of authentication information requested in the authentication information request. According to various example embodiments, the security level may include a first security level related to controlling of a function of the external device (for example, logon of the external device), and a second security level related to inputting of user information (for example, inputting for an account (logon), payment, an electronic signature, user approval, or the like) during use of the external device. According to an example embodiment, the second security level may be higher than the first security level and may be requested when substantial user information is required to be inputted in the external device. For example, the controlling of the function of the external device may require a low security level, and the inputting of the user information in the external device may require a high security level since substantial user authentication is required.

In operation 1011, the controller 480 may determine the security level based on the type of the authentication information request. For example, the controller 480 may determine whether the security level of the requested authentication information is based on the first security level or the second security level.

In operation 1011, when it is determined that the security level of the requested authentication information is the first security level (YES in operation 1011), the controller 480 may generate first control data based on random data in operation 1013. For example, the controller 480 may generate the first control data (for example, signed data) by encrypting the random data received from the external device using its own private key.

In operation 1015, the controller 480 may transmit the generated first control data (for example, signed data) to the external device via wireless communication.

In operation 1011, when it is determined that the security level of the requested authentication information is the second security level (NO in operation 1011), the controller 480 may generate second control data based on the random data and the user information in operation 1017. For example, the controller 480 may generate the second control data (for example, signed data or fingerprint data) by encrypting the random data received from the external device and the user information (for example, fingerprint data) using its own private key.

In operation 1019, the controller 480 may transmit the generated second control data (for example, signed data or fingerprint data) to the external device via wireless communication.

According to various example embodiments, when the security level is the second security level, the controller 480 may include, in the second control data, user information (for example, a user name, account information (for example, an ID and a password) set by the user, payment approval information, or the like) which varies according to the type of the requested authentication information.

For example, when authentication information for logging in a specific web site is requested by the external device, the controller 480 may generate the second control data based on pre-set account information, and provide the second control data to the external device. In another example, when authentication information for inputting payment approval information (for example, an approval number in a received message) received by the electronic device 400 from the external device is requested, the controller 480 may generate the second control data by extracting the approval number in the received message, and may provide the second control data to the external device. In another example, when authentication information for approving the user is requested from the external device, the controller 480 may generate the second control data based on the acquired fingerprint data, and may provide the second control data to the external device.

According to various example embodiments, the controller 480 may provide different control data according to authentication information (for example, user information) necessary for the external device when the user is authenticated based on user's own biometric information (for example, fingerprint information).

Figure 11:
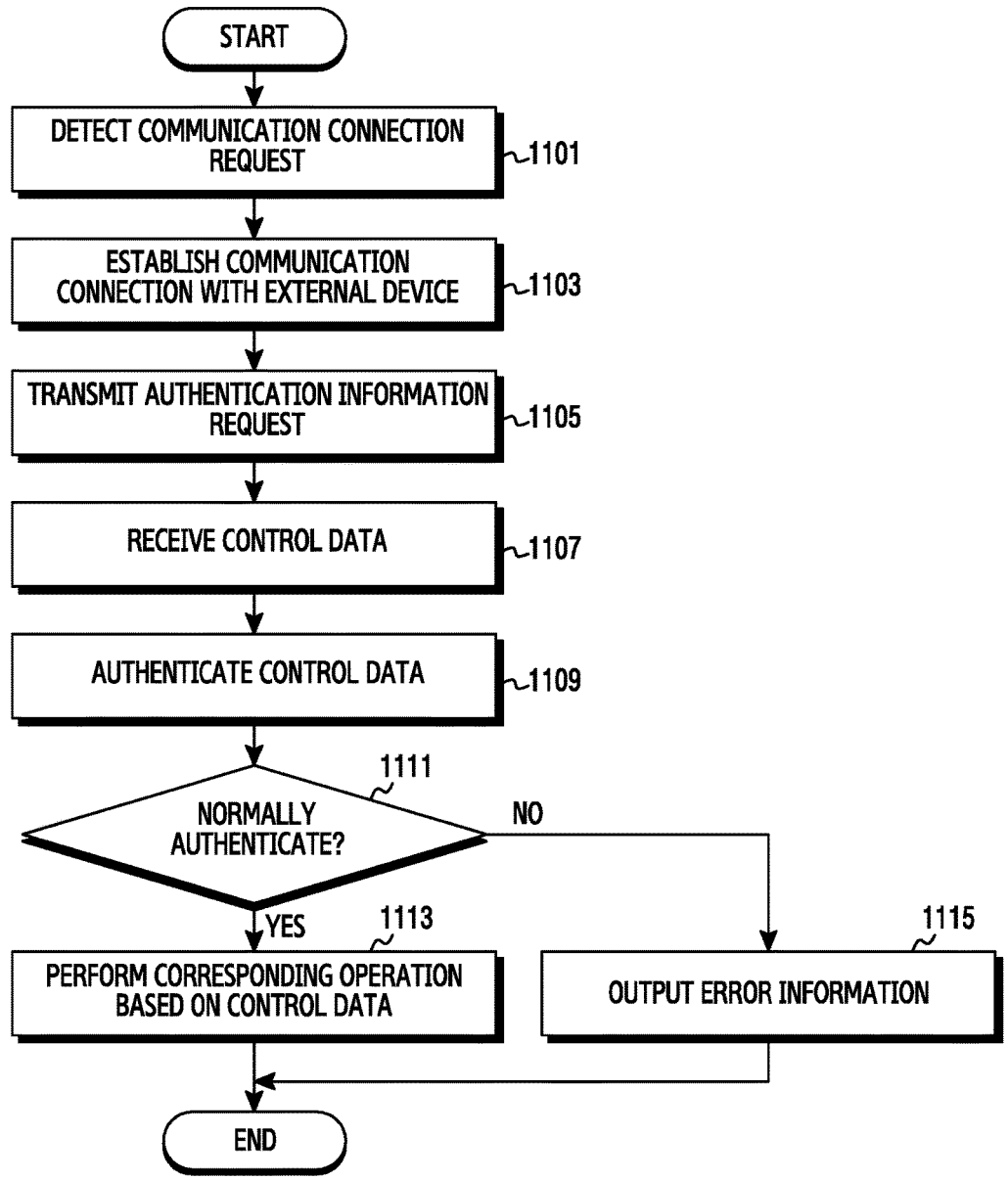
FIG. 11 is a flowchart illustrating an example method for operating in an electronic device based on authentication information of an external device according to various example embodiments of the present disclosure.

FIG. 11 is a flowchart illustrating an example method for operating in an electronic device based on authentication information of an external device according to various example embodiments of the present disclosure.

In FIG. 11, the electronic device may be the second electronic device 500 which requests authentication information from an external device, and the external device may be the first electronic device 400 which acquires substantial user information in response to an authentication information request and provides the user information to the second electronic device 500.

Referring to FIG. 11, in operation 1101, the controller 480 of the electronic device 500 may detect a communication connection request from the external device (for example, the first electronic device 400). For example, the controller 480 may receive a request for a wireless communication connection (for example, a Bluetooth connection) from the first electronic device 400 as shown in FIG. 6 described above.

In operation 1103, the controller 480 may establish a communication connection with the external device. For example, in response to the communication connection request, the controller 480 may accept the communication connection with the external device and establish the communication connection with the external device.

In operation 1105, the controller 480 may transmit an authentication information request to the external device. According to various example embodiments, when the communication connection with the external device is established, the controller 480 may request authentication information related to user authentication from the external device. According to an example embodiment, the controller 480 may include random data which is randomly generated such as a challenge or a random number in the authentication information request and transmit the authentication information request.

In operation 1107, the controller 480 may receive control data from the external device.

In operation 1109, the controller 480 may authenticate the received control data, and determine whether the control data is normally authenticated or not in operation 1111. According to an example embodiment, the controller 480 may decrypt the received control data using a public key of the external device which is pre-stored. The controller 480 may determine whether the decrypted control data is valid or not based on the random data transmitted to the external device. For example, the controller 480 may determine whether the result of the decryption (for example, the decrypted control data) is the same as the random data (for example, a challenge or a random number) transmitted to the external device, and authenticate the external device when the result of the decryption is the same as the random data. According to an example embodiment, when the external device provides first control data, the controller 480 may decrypt the first control data based on the public key and authenticate the first control data by comparing signed data the first control data and the random data. According to an example embodiment, when the external device provides second control data, the controller 480 may decrypt the second control data based on the public key and authenticate the second control data by comparing signed data of the second control data and the random data. When the second control data is normally authenticated, the controller 480 may acquire user information (for example, fingerprint data) of the second control data.

In operation 1111, when the control data is determined to be valid (YES in operation 1111), for example, when the control data is consistent with the random data, the controller 480 may process and perform a corresponding operation based on the control data in operation 1113. According to an example embodiment, when the electronic device 500 is booted in a lock state, the controller 480 may perform a logon operation based on the result of the authentication of the control data. In another example, the controller 480 may input information necessary in the use state of the electronic device 500 using the user information (for example, account information, approval information, fingerprint data, or the like) of the control data which is received in the use state (for example, a state in which the electronic device accesses a web site and is required to input user information to the web site).

In operation 1111, when the control data is not determined to be valid (NO in operation 1111), for example, when the control data is not consistent with the random data, the controller 480 may output error information in operation 1115. According to an example embodiment, the controller 480 may notify that the external device is an unauthenticated (unidentified) device. According to an example embodiment, the controller 480 may not perform any operation (for example, a logon operation) in response to the control data being received. Additionally or alternatively, the controller 480 may request authentication information from the external device again.

Figure 12:
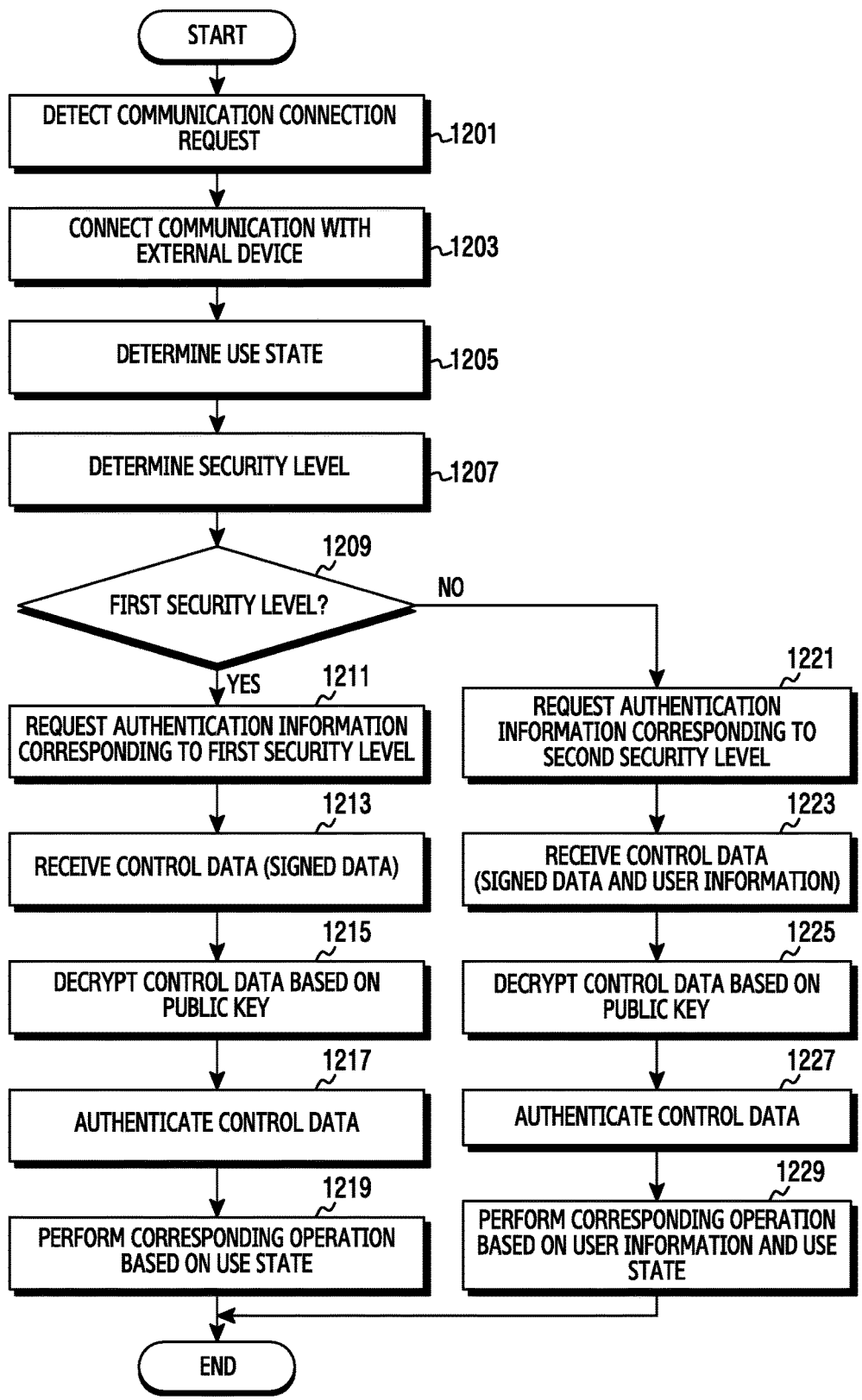
FIG. 12 is a flowchart illustrating an example method for requesting authentication information in an electronic device based on a use state according to various example embodiments of the present disclosure.

FIG. 12 is a flowchart illustrating an example method for requesting authentication information based on a use state in an electronic device according to various example embodiments of the present disclosure.

In FIG. 12, the electronic device may be the second electronic device 500 which requests authentication information from an external device, and the external device may be the first electronic device 400 which acquires substantial user information in response to the authentication information request of the second electronic device 500, and provides the user information to the second electronic device 500.

Referring to FIG. 12, in operation 1201, the controller 480 of the electronic device 500 may detect a communication connection request from the external device (for example, the first electronic device 400). For example, the controller 480 may receive a request for a wireless communication connection (for example, a Bluetooth connection) from the first electronic device 400 as shown in FIG. 6 described above.

In operation 1203, the controller 480 may connect communication with the external device. For example, the controller 480 may accept the communication connection with the external device in response to the communication connection request, and establish the communication connection with the external device.

In operation 1205, the controller 480 may determine the use state of the electronic device 500. For example, the controller 480 may determine whether the electronic device 500 is in a use state or a non-use state. According to an example embodiment, the non-use state of the electronic device 500 includes a state in which the electronic device 500 is booted in a lock state and listens to logon. According to an example embodiment, the use state of the electronic device 500 may be a state in which the electronic device 500 performs a specific function or listens to a user input in a logon state, and for example, may include a state in which the electronic device 500 listens to an input of account information for logging in according to access to a web site, a state in which the electronic device 500 listens to an input of user information in a function or an application requiring user authentication, or a state in which the electronic device 500 listens to an input of approval information transmitted from a corresponding server to the external device (for example, the first electronic device 400) during a payment process.

In operation 1207, the controller 480 may determine a security level for an authentication information request, and in operation 1209, may determine whether the determined security level is a first security level or a second security level. According to various example embodiments, the controller 480 may determine the security level based on at least a part of the use state or the non-use state of the electronic device 500 or authentication information (for example, user information) necessary (required) in the use state. According to various example embodiments, the security level may include the first security level related to controlling of a function (for example, a logon) of the electronic device 500, and the second security level related to inputting of user information (for example, inputting for an account, payment, an electronic signature, or user approval) during the use of the electronic device 500. According to an example embodiment, the second security level may be higher than the first security level, and may be determined when substantial user information is required to be inputted in the electronic device 500. For example, the controlling of the function of the electronic device 500 may require a low security level, and the inputting of the user information in the electronic device 500 may require a high security level since substantial user authentication is required.

In operation 1209, when the security level is determined to be the first security level (YES in operation 1209), the controller 480 may transmit an authentication information request corresponding to the first security level to the external device in operation 1211. The controller 480 may generate random data when requesting the authentication information, and transmit the authentication information request according to the first security level and the random data to the external device.

In operation 1213, the controller 480 may receive control data from the external device. According to an example embodiment, the controller 480 may receive first control data from the external device in response to the authentication information request according to the first security level. According to various example embodiments, the first control data may include signed data based on the first security level.

In operation 1215, the controller 480 may decrypt the control data based on a public key. According to an example embodiment, the controller 480 may decrypt the received first control data using the stored public key of the external device and acquire decrypted control data (for example, signed data).

In operation 1217, the controller 480 may authenticate the decrypted control data (for example, signed data). For example, the controller 480 may determine whether the decrypted control data (for example, signed data) is normally authenticated or not. According to an example embodiment, the controller 480 may determine whether the decrypted control data is valid or not based on the random data transmitted to the external device. For example, the controller 480 may determine whether the signed data is the same as the random data transmitted to the external device, and, when the signed data is the same as the random data, the controller 480 may authenticate the external device.

In operation 1219, the controller 480 may process (e.g., perform) a corresponding operation based on the use state of the electronic device 500. According to an example embodiment, the controller 480 may perform a logon operation of the electronic device 500 based on the result of the authentication of the control data when the electronic device 500 is booted in a lock state.

In operation 1209, when the security level is determined to be the second security level (NO in operation 1209), the controller 480 may transmit an authentication information request corresponding to the second security level to the external device in operation 1221. The controller 480 may generate random data when requesting the authentication information, and transmit the authentication information request according to the second security level and the random data to the external device. Additionally or selectively, the controller 480 may identify a type of authentication information requested according to the second security level when determining the second security level, and provide the type of the authentication information. For example, the controller 480 may determine user information (for example, account information, approval information, biometric information (for example, fingerprint information), or the like) necessary according to the use state of the electronic device, and may notify the external device of the type of the user information required based on the result of the determining.

In operation 1223, the controller 480 may receive control data from the external device. According to an example embodiment, the controller 480 may receive second control data from the external device in response to the authentication information request according to the second security level. According to various example embodiments, the second control data may include signed data and user information (for example, account information, approval information, biometric information (for example, fingerprint information), or the like) based on the second security level.

In operation 1225, the controller 480 may decrypt the control data based on a public key. According to an example embodiment, the controller 480 may decrypt the received second control data using the stored public key of the external device and acquire decrypted control data (for example, signed data and user information).

In operation 1227, the controller 480 may authenticate the decrypted control data (for example, signed data and user information). For example, the controller 480 may determine whether the decrypted control data (for example, signed data and user information) is normally authenticated or not. According to an example embodiment, the controller 480 may determine whether the decrypted control data is valid or not based on the random data transmitted to the external device. For example, the controller 480 may determine whether the signed data of the decrypted control data is the same as the random data transmitted to the external device, and, when the signed data is the same as the random data, the controller 480 may authenticate the external device. When the external device is authenticated, the controller 480 may acquire user information from the decrypted control data. According to an example embodiment, the controller 480 may decrypt the second control data based on the public key, authenticate the second control data by comparing the signed data of the second control data and the random data, and, when the second control data is normally authenticated, acquire the user information (for example, account information, approval information, biometric information, or the like) of the second control data.

In operation 1229, the controller 480 may process (e.g., perform) a corresponding operation based on the use state of the electronic device 500 and the user information. For example, the controller 480 may input information necessary in the use state of the electronic device 500 using the user information (for example, account information, approval information, fingerprint data, or the like) in a specific use state of the electronic device 500 (for example, a state in which the electronic device 500 accesses a web site and is required to input user information to the web site). According to an example embodiment, when the electronic device 500 is in the use state to log in a specific web site, the controller 480 may try to login after inputting account information (for example, an ID or a password) for logging in the web site based on the acquired user information (for example, account information). According to an example embodiment, when the electronic device 500 is in the use state to input approval information (for example, an approval number in a received message) transmitted from a server to the external device, the controller 480 may input the approval information based on the acquired user information (for example, approval information) and then may request a result of approval from the server. According to an example embodiment, when the electronic device 500 is in the use state to input biometric information (for example, fingerprint information) related to user authentication, the controller 480 may input fingerprint information based on the acquired user information (for example, fingerprint information) and then request a result of approval from the server or may directly transmit the acquired user information to the related server.

Figure 13:
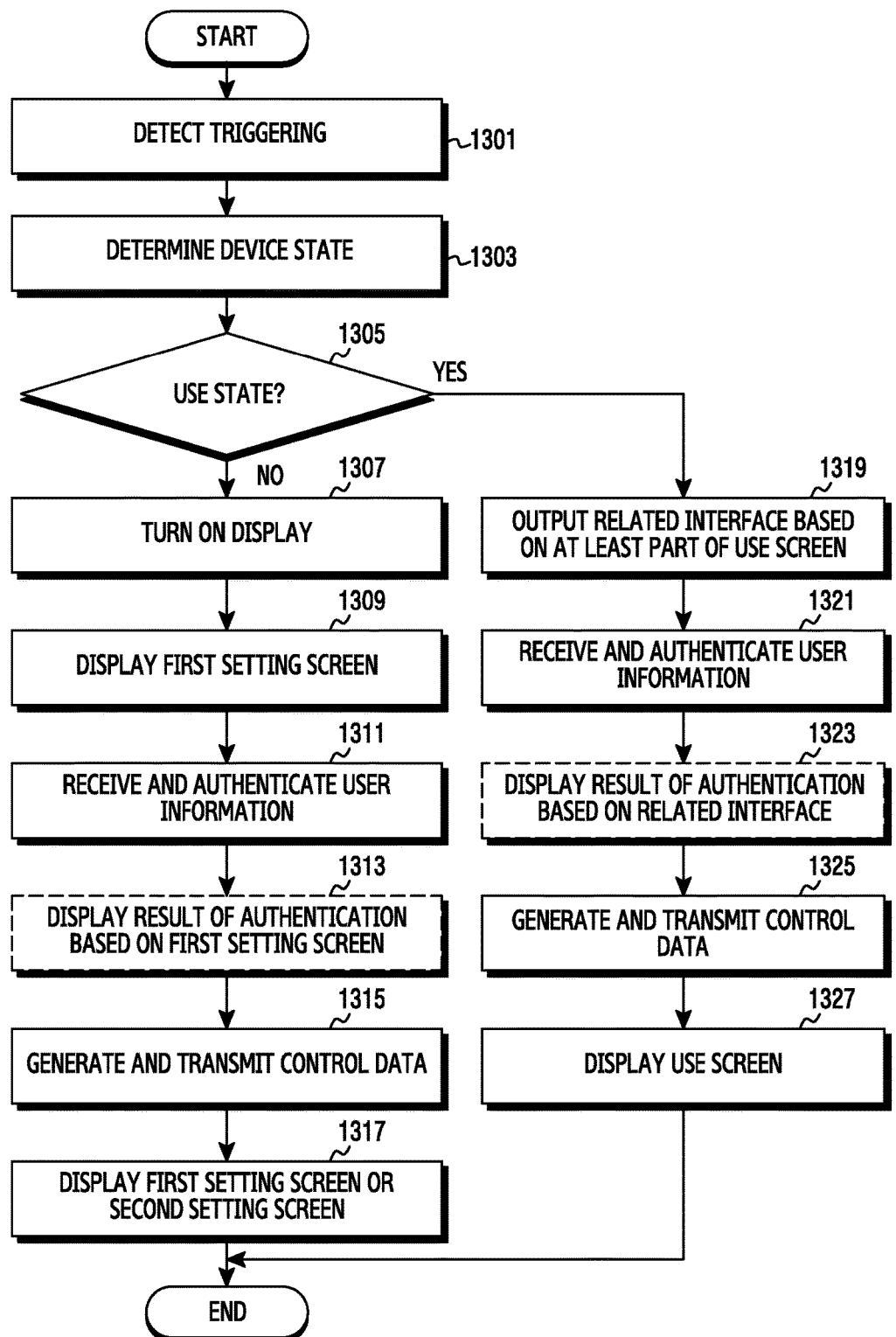
FIG. 13 is a flowchart illustrating an example method for operating in an electronic device according to a use state according to various example embodiments of the present disclosure.

FIG. 13 is a flowchart illustrating an example method for operating in an electronic device according to a use state according to various example embodiments of the present disclosure.

In FIG. 13, the electronic device may be the first electronic device 400 which tries to connect communication by acquiring connection information of an external device from the NFC tag 600 of the external device (for example, the second electronic device 500), and acquires authentication information and provides the same. FIG. 13 illustrates an example of an operation of the first electronic device 400 which operates according to event triggering in a use state or a non-use state.

Referring to FIG. 13, in operation 1301, the controller 480 of the electronic device 400 may detect triggering. For example, the controller 480 may determine triggering for connecting wireless communication with the external device (for example, the second electronic device 500) in response to NFC tagging, that is, in response to the electronic device 400 being brought into contact with or close to the NFC tag 600 as shown in FIG. 6 described above.

In operation 1303, the controller 480 may determine the state of the device, and in operation 1305, the controller 480 may determine whether the electronic device 400 is in a use state or a non-use state. For example, in response to the triggering being detected, the controller 480 may determine the use state or the non-use state of the electronic device 400 based on whether the display 431 is in an inactive state (for example, an off state) or an active state (for example, an on state).

In operation 1305, when it is determined that the electronic device 400 is in the non-use state (NO in operation 1305), the controller 480 may control the display 431 to be turned on in operation 1307.

In operation 1309, the controller 480 may operate to display a first setting screen on the display 431 in response to the display 431 being turned on. According to an example embodiment, when the electronic device 400 sets a lock, the controller 480 may be set to display a screen interface (for example, a GUI or a UI) related to a lock screen. According to an example embodiment, when the electronic device 400 does not set a lock, the controller 480 may be set to display a screen interface related to a screen (for example, a home screen) set as default or an execution screen of a previously executed application. According to various example embodiments, when displaying the first setting screen, the controller 480 may output, to a certain area of the first setting screen, guide information (for example, a virtual fingerprint image, a text, or the like) for guiding the user to input user information in response to an authentication information request of the external device.

In operation 1311, the controller 480 may receive and authenticate user information. According to various example embodiments, the controller 480 may acquire user's fingerprint data via the fingerprint recognition sensor 475 and processes a corresponding authentication operation.

In operation 1313, the controller 480 may display the result of the authentication based on the first setting screen. According to an example embodiment, when the user's fingerprint data is not valid, the controller 480 may operate to display a related guide message (for example, "The fingerprint you entered does not match") through the first setting screen (for example, a lock screen). According to various example embodiment, when the user fingerprint data is valid, the controller 80 may not perform operation 1313 of displaying the result of the authentication and proceed to operation 1315 to process operations after operation 1315.

In operation 1315, in response to the user authentication being completed, the controller 480 may generate control data and transmit the generated control data to the external device. According to an example embodiment, the controller 480 may generate first control data or second control data according to requested authentication information. According to an example embodiment, when generating the second control data, the controller 480 may compose user information differently according to the requested authentication information and include the user information in the second control data. According to an example embodiment, the controller 480 may include account information pre-set in the electronic device 400 based on the user authentication as the user information. According to an example embodiment, the controller 480 may extract approval information of a message received at the electronic device 400 based on the user authentication, and may include the approval information as the user information. According to an example embodiment, the controller 480 may include fingerprint information acquired through the fingerprint recognition sensor 475 based on the user authentication as the user information.

In operation 1317, the controller 480 may control the electronic device to display the first setting screen or a second setting screen. According to an example embodiment, when the first setting screen is a home screen or an execution screen of an application, the controller 480 may control to keep displaying the first setting screen. According to an example embodiment, when the first setting screen is a lock screen, the controller 480 may control to switch to the second setting screen (for example, a home screen or an execution screen) and display the second setting screen.

In operation 1305, when it is determined that the electronic device 400 is in the use state (YES in operation 1305), the controller 480 may output a related interface based on at least a part of a used screen in operation 1319. According to an example embodiment, in a state in which an execution screen of an application is displayed, the controller 480 may output, to at least a part of the related interface or a certain area of the execution screen, guide information (for example, a virtual fingerprint image, a text, or the like) for guiding the user to input user information in response to an authentication information request of the external device.

In operation 1321, the controller 480 may receive and authenticate user information. According to various example embodiments, the controller 480 may acquire user's fingerprint data through the fingerprint recognition sensor 475 and process a corresponding authentication operation.

In operation 1323, the controller 480 may display the result of the authentication based on the related interface. According to an example embodiment, when the user's fingerprint data is not valid, the controller 480 may operate to display a related guide message (for example, "The fingerprint you entered does not match") through at least a part of the related interface or a certain area of the execution screen. According to various example embodiments, when the user's fingerprint data is valid, the controller 480 may not perform operation 1323 of displaying the result of the authentication and proceed to operation 1325 to process operations after operation 1325.

In operation 1325, in response to the user authentication being completed, the controller 480 may generate control data and transmit the generated control data to the external device. According to an example embodiment, the controller 480 may generate first control data or second control data according to requested authentication information. According to an example embodiment, when generating the second control data, the controller 480 may compose different user information (for example, account information, approval information, fingerprint information, or the like) according to the requested authentication information, and include the user information in the second control data.

In operation 1327, the controller 480 may control to display a use screen. According to an example embodiment, the controller 480 may control to keep displaying the use screen displayed when the triggering is detected.

Hereinafter, an operation of the first electronic device 400 connecting communication by controlling waking-up of the second electronic device 500 when trying to connect communication with the second electronic device 500 after event triggering (for example, NFC tagging) according to various example embodiments will be described. According to various example embodiments, the electronic device 500 is required to be woken up when the second electronic device 500 is in a hibernation or power off state or in a communication function off state (for example, a Bluetooth off state).

Figure 14:
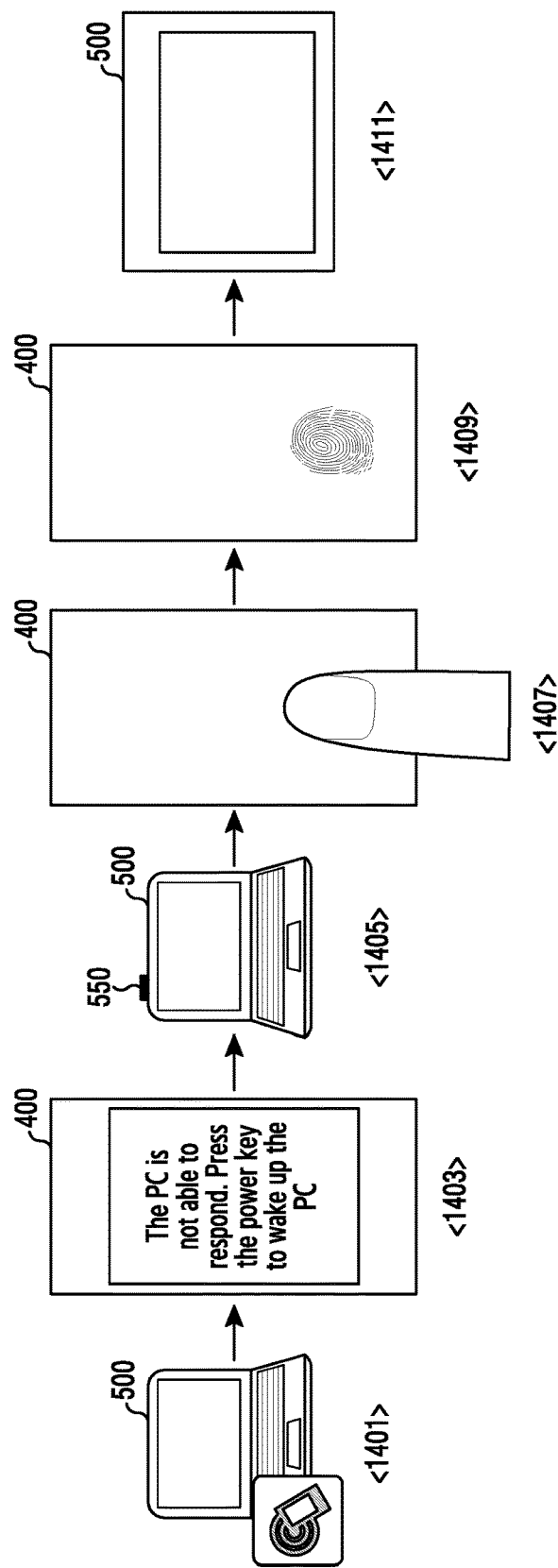
FIG. 14 is a diagram illustrating an example operation of connecting between electronic devices in a system according to various example embodiments of the present disclosure.

FIG. 14 is a diagram illustrating an example operation of connecting between electronic devices in a system according to various example embodiments of the present disclosure.

Referring to FIG. 14, in operation 1401, the first electronic device 400 and the second electronic device 500 may be tagged to each other by the user. According to an example embodiment, the user may bring the first electronic device 400 close to or into contact with the NFC tag 600 of the second electronic device 500 (for example, NFC tagging).

The first electronic device 400 may determine event triggering according to NFC tagging, and try to connect communication (for example, a Bluetooth connection) with the second electronic device 500 based on connection information acquired through the NFC tag 600. When the first electronic device 400 tries to connect communication with the second electronic device 500, but does not receive a response from the second electronic device 500, the first electronic device 400 may determine that the communication connection fails.

In operation 1403, when it is determined that the communication connection with the second electronic device 500 fails, the first electronic device 400 may display a related guide indicating that the second electronic device 500 does not respond and guiding the user to wake up the second electronic device 500. For example, the first electronic device 400 may operate to display a guide message (for example, "The PC is not able to respond. Press the power key to wake up the PC.") through the display 431. According to various example embodiments, the guide message may be provided in the form of an overlay, picture in picture (PIP), picture by picture (PBP), or a split screen. According to various example embodiments, the related guide may output a set sound (for example, a guide voice) through the speaker 441 of the electronic device 400 and may additionally provide vibration feedback. According to various example embodiments, the first electronic device 400 may operate in order for the user to manually wake up the second electronic device 500.

According to various example embodiments, the first electronic device 400 may continue to try to connect communication with the second electronic device 500 at regular intervals, while processing the guide output as in operation 1403. According to an example embodiment, the first electronic device 400 may process the outputting the guide on a foreground and may process the trying to connect communication on a background until the second electronic device 500 is woken up and a communication connection is established (for example, a communication connection response is received).

In operation 1405, the user may wake up the second electronic device 500 according to the guide of the first electronic device 400. According to an example embodiment, the user may wake up the second electronic device 500 by pressing a power button 550 of the second electronic device 500. After being woken up, the second electronic device 500 may detect a communication connection request from the electronic device 400, and may connect communication (for example, a Bluetooth connection) with the first electronic device 400 in response to the communication connection request. When the wireless communication with the first electronic device 400 is connected, the second electronic device 500 may transmit an authentication information request to the first electronic device 400 via the connected wireless communication.

In operation 1407, after connecting the wireless communication with the second electronic device 500, the first electronic device 400 may receive the authentication information request from the second electronic device 500 via the connected wireless communication. When the authentication information request is received, the first electronic device 400 may listen to a fingerprint information input from the user. The first electronic device 400 may output a related guide for obtaining user's fingerprint information as a set sound or may display a related interface (for example, a GUI or a UI). The user may input a user fingerprint through the display 431 or the button 515 including the fingerprint recognition sensor 475 of the first electronic device 400. According to an example embodiment, the user may input the user fingerprint in a swipe type by dragging a user's finger on an area of the first electronic device 400 in which the fingerprint recognition sensor 475 is disposed (for example, a certain area of the display 431 or the button 515) in a predetermined direction, or may input the user fingerprint in a fixed area type by placing a user's finger on an area in which the fingerprint recognition sensor 475 is disposed during a predetermined time.

In operation 1409, the first electronic device 400 may scan the user fingerprint based on the fingerprint recognition sensor 475, and authenticate the user based on the scanned image. According to an example embodiment, the first electronic device 400 may acquire a fingerprint image from the image scanned through the fingerprint recognition sensor 475, and may determine whether the acquired fingerprint image is valid or not. For example, the first electronic device 400 may extract a characteristic of the fingerprint image acquired through the fingerprint recognition sensor 475, and authenticate the user by comparing and/or matching the characteristic with characteristic information of the user (for example, fingerprint information) pre-registered at the memory 450 (for example, a database). When the user authentication is completed, the first electronic device 400 may transmit the result of the authentication (for example, signed data, fingerprint data, or the like) to the second electronic device 500.

In operation 1411, the second electronic device 500 may receive the result of the authentication from the first electronic device 400, and process a corresponding operation based on the result of the authentication. For example, the second electronic device 500 may perform a related operation according to the use state or the non-use state of the second electronic device 500, or the user information necessary in the use state. According to an example embodiment, the second electronic device 500 may perform a logon operation based on the user information when the second electronic device 500 is booted in a lock state. According to an example embodiment, the second electronic device 500 may input information (for example, account information, approval information, fingerprint information, or the like) necessary in the use state using user information received in the use state (for example, a state in which the second electronic device 500 accesses a web site and is required to input the user information to the web site).

Figure 15:
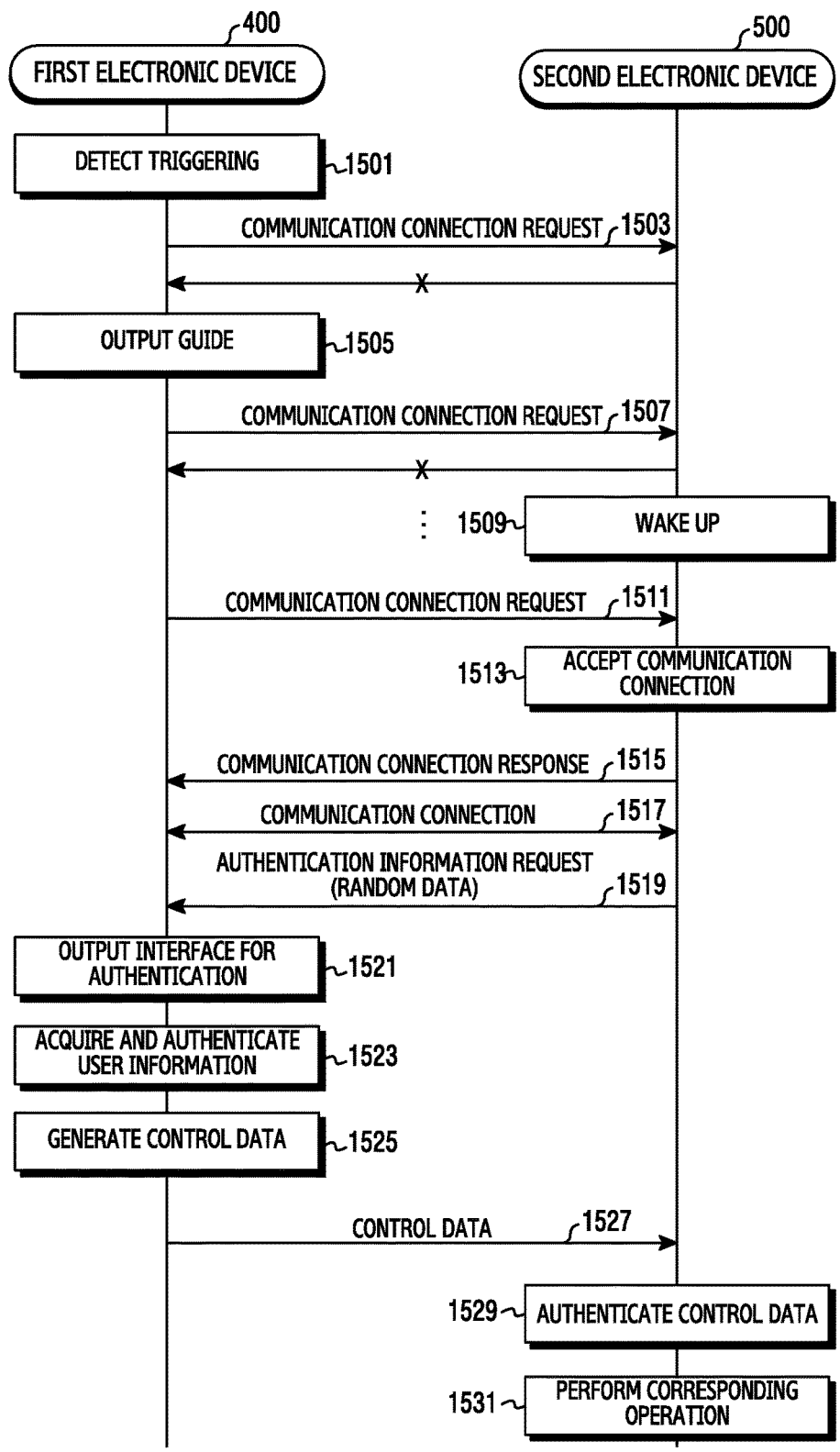
FIG. 15 is a signal flowchart illustrating example operations of connecting communication and transmitting and receiving authentication information between electronic devices in a system according to various example embodiments of the present disclosure.

FIG. 15 is a signal flowchart illustrating example operations of connecting communication and transmitting and receiving authentication information between electronic devices in a system according to various example embodiments of the present disclosure.

Referring to FIG. 15, in operation 1501, the first electronic device 400 may detect triggering. For example, the first electronic device 400 may determine triggering for connecting wireless communication with the second electronic device 500 in response to NFC tagging as shown in FIG. 14 described above. The first electronic device 400 may acquire connection information related to a connection with the second electronic device 500 from the NFC tag 600 according the NFC tagging.

In operation 1503, the first electronic device 400 may try to connect communication with the electronic device 500 in response to the triggering being detected. According to an example embodiment, the first electronic device 400 may transmit a communication connection request for connecting Bluetooth communication with the second electronic device 500 to the second electronic device 500 based on the acquired connection information. According to various example embodiments, the second electronic device 500 may be in a hibernation or power off state or a communication function off state (for example, a Bluetooth off state). Accordingly, the second electronic device 500 may not respond to the communication connection request of the first electronic device 400.

In operation 1505, when a response is not received from the second electronic device 400 within a predetermined time after the communication connection is requested, the first electronic device 400 may output a guide. According to an example embodiment, when a response is not received from the second electronic device 500, the first electronic device 400 may determine that the communication connection fails, and display a related guide guiding the user to wake up the second electronic device 500.

In operations 1507 and 1511, the first electronic device 400 may continue to try to connect communication with the second electronic device 500 at regular intervals in sequence or in parallel with outputting the guide. According to various example embodiments, the first electronic device 400 may process the trying to connect communication on a background until the second electronic device 500 is woken up and the communication connection is established (for example, the communication connection response is received), and may not receive a response until the second electronic device 500 is woken up.

In operation 1509, the second electronic device may be woken up. According to an example embodiment, the second electronic device 500 may be woken up by a user's input on the power button 550. For example, the second electronic device 500 may be woken up in the hibernation or power off state or the communication function off state (for example, the Bluetooth off state) in response to a wake-up signal generated by the power button 550.

In operation 1513, when the second electronic device 500 receives a communication connection request from the first electronic device 400 after being woken up 1511, the second electronic device 400 may accept the communication connection in response to the communication connection request in operation 1513. According to various example embodiments, after being woken up, the second electronic device 500 may listen to a communication connection of the first electronic device 400 through a virtual biometric authentication sensor driver, and, when receiving a communication connection request from the electronic device 400 while listening to the communication connection, the second electronic device 500 may accept the communication connection.

In operation 1515, the second electronic device 500 may transmit a communication connection response to the first electronic device 400 in response to the communication connection request.

In operation 1517, the first electronic device 400 and the second electronic device 500 may establish a communication connection. According to an example embodiment, the first electronic device 400 and the second electronic device 500 may connect Bluetooth communication.

In operation 1519, the second electronic device 500 may transmit an authentication information request to the first electronic device 400. According to various example embodiments, when the communication connection with the first electronic device 400 is established, the second electronic device 500 may request authentication information related to user authentication from the first electronic device 400. According to an example embodiment, the second electronic device 500 may include random data in the authentication information request and transmit the authentication information request.

In operation 1521, when the authentication information request is received from the second electronic device 500, the first electronic device 400 may output a related interface (for example, a GUI or a UI) for authenticating the user. According to an example embodiment, the first electronic device 400 may output a related interface for acquiring user's fingerprint information, and may listen to a fingerprint input by the user.

In operation 1523, the first electronic device 400 may acquire user information and authenticate the acquired user information. For example, the first electronic device 400 may scan a user fingerprint based on the fingerprint recognition sensor 475, and authenticate the user based on the scanned image.

In operation 1525, when the user authentication is completed (for example, when the user authentication is valid), the first electronic device 400 may generate control data including the result of the authentication (for example, signed data, user information, or the like). According to an example embodiment, when the user authentication is completed, the first electronic device 400 may generate first control data (for example, signed data) by encrypting random data received from the second electronic device 500 using a private key. According to another example embodiment, when the user authentication is completed, the first electronic device 400 may generate second control data (for example, signed and user information) by encrypting the random data received from the second electronic device 500 and the user information (for example, account information, approval information, fingerprint information, or the like)

using the private key of the first electronic device 400. According to various example embodiments, the first electronic device 400 may generate the first control data or the second control data according to the type of the authentication information request of the second electronic device 500.

In operation 1527, the first electronic device 400 may transmit the control data to the second electronic device 500.

In operation 1529, when the control data is received from the first electronic device 400, the second electronic device 500 may authenticate the control data. According to an example embodiment, the second electronic device 500 may decrypt the control data using a public key of the first electronic device 400 which is pre-stored. The second electronic device 500 may determine whether the decrypted control data (for example, signed data) is valid or not based on the random data transmitted to the first electronic device 400. According to an example embodiment, the second electronic device 500 may compare the signed data and the random data and authenticate the first electronic device 400 according to whether the signed and the random data are the same or not.

In operation 1531, the second electronic device 500 may perform a corresponding operation based on the result of the authentication of the control data. According to an example embodiment, the second electronic device 500 may perform a logon operation. According to an example embodiment, the second electronic device 500 may input information (for example, account information, approval information, fingerprint information, or the like) necessary in the current use state of the second electronic device 500 using the user information.

Figure 16:
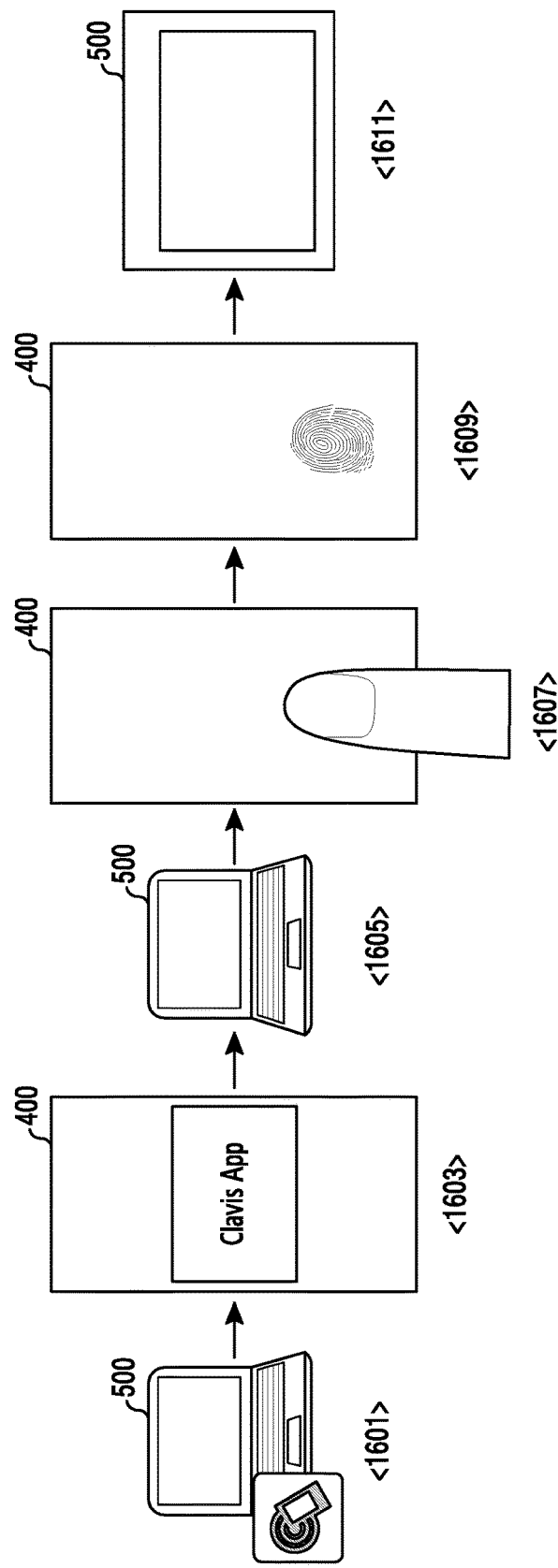
FIG. 16 is a diagram illustrating an example operation of connecting between electronic devices in a system according to various example embodiments of the present disclosure.

FIG. 16 is a diagram illustrating an example operation of connecting between electronic devices in a system according to various example embodiments of the present disclosure.

Referring to FIG. 16, in operation 1601, the first electronic device 400 and the second electronic device 500 may be tagged to each other by the user. According to an example embodiment, the user may bring the first electronic device 400 close to or into contact with the NFC tag 600 of the second electronic device 500 (for example, NFC tagging).

The first electronic device 400 may determine event triggering according to NFC tagging, and try to connect communication (for example, a Bluetooth connection) with the second electronic device 500 based on connection information acquired through the NFC tag 600. When the first electronic device 400 tries to connect communication with the second electronic device 500, but does not receive a response from the second electronic device 500, the first electronic device 400 may determine that the communication connection fails.

In operation 1603, when it is determined that the communication connection with the second electronic device 500 fails, the first electronic device 400 may control to wake up the second electronic device 500. According to an example embodiment, the first electronic device 400 may transmit a wake-up command for waking up the second electronic device 500 via wireless communication (for example, Bluetooth communication, BLE communication, or the like). According to an example embodiment, the first electronic device 400 may include the wake-up command in a signal to be transmitted to request a communication connection to the second electronic device 500 or a signal corresponding thereto, and may transmit the wake-up command to the second electronic device 500. According to various example embodiments, the first electronic device 400 may display a related interface (for example, a GUI or a UI) guiding that the first electronic device 400 tries to wake up the second electronic device 500 and/or connects communication.

According to various example embodiments, the first electronic device 400 may try to connect communication with the second electronic device 500 in sequence or in parallel with transmitting the wake-up command to the second electronic device 500. According to an example embodiment, the first electronic device 400 may listen for a predetermined time (for example, M seconds, for example, a time which is set according to time required to wake up the second electronic device 500) after transmitting the wake-up command, and then may re-transmit the communication connection request. According to an example embodiment, as shown in FIG. 14, the first electronic device 400 may continue to try to request a communication connection at predetermined time intervals until a response is received from the second electronic device 500.

In operation 1605, the second electronic device 500 may be automatically woken up in response to the wake-up command being received from the first electronic device 400. After being woken up, the second electronic device 500 may detect the communication connection request from the first electronic device 400, and may connect communication with the first electronic device 400 (for example, a Bluetooth connection) in response to the communication connection request. When the wireless communication with the first electronic device 400 is connected, the second electronic device 500 may transmit an authentication information request to the first electronic device 400 via the connected wireless communication.

In operation 1607, in response to the authentication information request being received from the second electronic device 500, the first electronic device 400 may acquire user information based on the fingerprint recognition sensor 475. Operation 1607 may correspond to operation 1407 of FIG. 14 described above, and a detailed description thereof is omitted.

In operation 1609, the first electronic device 400 may authenticate the user based on the acquired user information and transmit the result of the authentication to the second electronic device 500. Operation 1609 may correspond to operation 1409 of FIG. 14 described above and a detailed description thereof is omitted.

In operation 1611, the second electronic device 500 may receive the result of the authentication from the first electronic device 400 and process a corresponding operation based on the result of the authentication. Operation 1611 may correspond to operation 1411 of FIG. 14 described above and a detailed description thereof is omitted.

Figure 17:
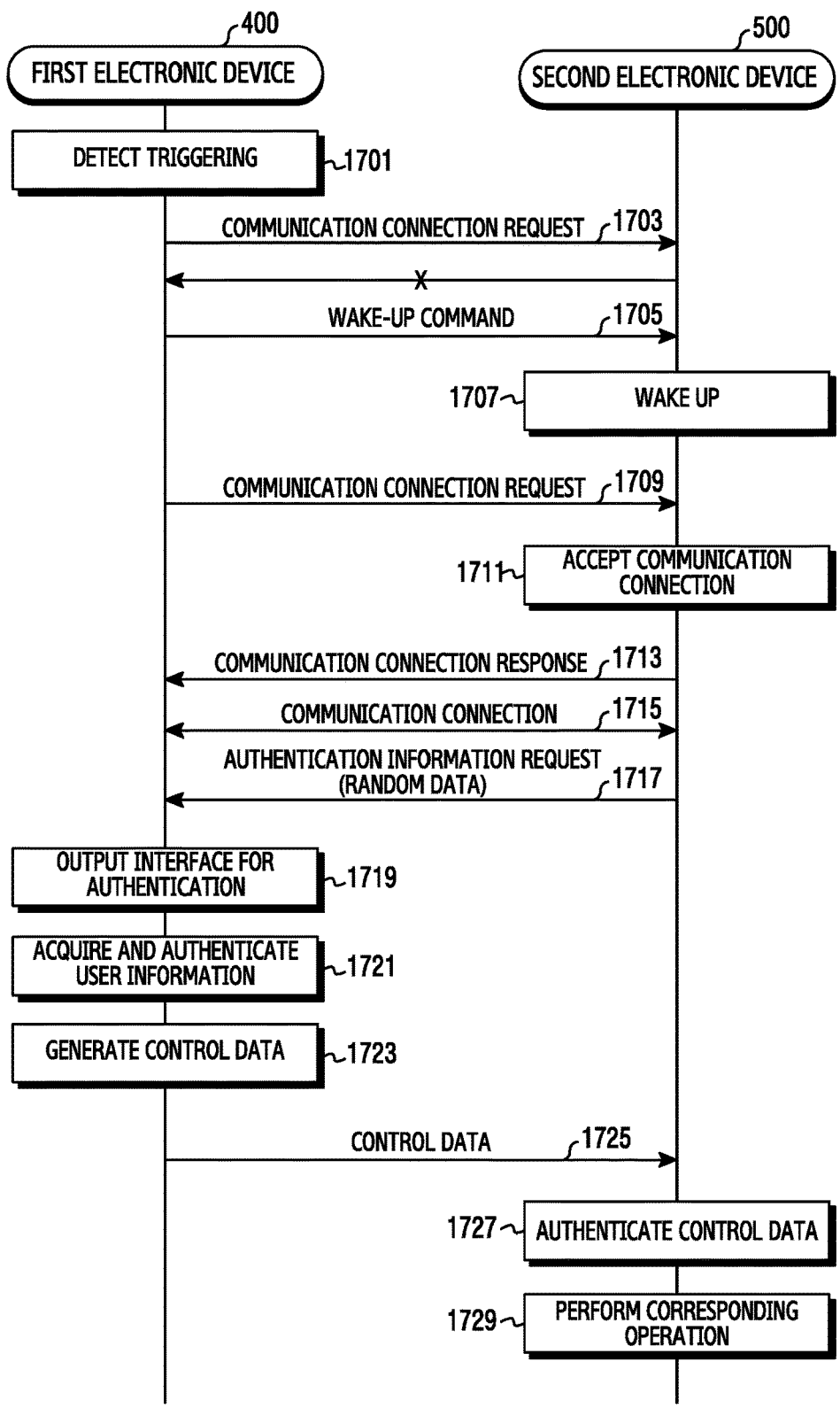
FIG. 17 is a signal flowchart illustrating example operations of connecting communication and transmitting and receiving authentication information between electronic devices in a system according to various example embodiments of the present disclosure.

FIG. 17 is a signal flowchart illustrating example operations of connecting communication and transmitting and receiving authentication information between electronic devices in a system according to various example embodiments of the present disclosure.

Referring to FIG. 17, in operation 1701, the first electronic device 400 may detect triggering. For example, the first electronic device 400 may determine triggering for connecting wireless communication with the second electronic device 500 in response to NFC tagging as illustrated in FIG. 16 described above. The first electronic device 400 may acquire connection information related to a connection with the second electronic device 500 from the NFC tag 600 according to the NFC tagging.

In operation 1703, the first electronic device 400 may try to connect communication with the electronic device 500 in response to the triggering being detected. According to an example embodiment, the first electronic device 400 may transmit a communication connection request for connecting Bluetooth communication with the second electronic device 500 to the second electronic device 500 based on the acquired connection information. According to various example embodiments, the second electronic device 500 may be in a hibernation or power off state or a communication function off state (for example, a Bluetooth off state). Accordingly, the second electronic device 500 may not respond to the communication connection request of the first electronic device 400.

In operation 1705, when the first electronic device 400 does not receive a response from the second electronic device 400 within a predetermined time after requesting the communication connection, the first electronic device 400 may transmit a wake-up command for waking up the second electronic device 500 to the second electronic device 500. According to an example embodiment, when the response is not received from the second electronic device 500, the first electronic device 400 may determine that the communication connection fails, and may transmit the wake-up command for waking up the second electronic device 500 based on a signal corresponding to the communication connection request in order to wake up the second electronic device 500.

According to various example embodiments, the first electronic device 400 may try to connect communication with the second electronic device 500 as in operation 1709 in sequence or in parallel with transmitting the wake-up command to the second electronic device 500. According to an example embodiment, the first electronic device 400 may listen for a predetermined time (for example, M seconds, for example, a time which is set according to time required to wake up the second electronic device 500) after transmitting the wake-up command, and then may re-transmit the communication connection request. According to an example embodiment, the first electronic device 400 may continue to try to request a communication connection at predetermined time intervals until a response is received from the second electronic device 500.

In operation 1707, the second electronic device 500 may be woken up. According to an example embodiment, the second electronic device 500 may be woken up by an input of the wake-up command of the first electronic device. For example, the second electronic device 500 may be automatically woken up in the hibernation or power off state or the communication function off state (for example, the Bluetooth off state) in response to the wake-up command.

In operation 1709, when the second electronic device 500 receives a communication connection request from the first electronic device 400 after being woken up, the second electronic device 400 may accept the communication connection in response to the communication connection request in operation 1711.

In operation 1713, the second electronic device 500 may transmit a communication connection response to the first electronic device 400 in response to the communication connection request.

In operation 1715, the first electronic device 400 and the second electronic device 500 may establish a communication connection. According to an example embodiment, the first electronic device 400 and the second electronic device 500 may connect Bluetooth communication.

In operation 1717, the second electronic device 500 may transmit an authentication information request to the first electronic device 400. According to various example embodiments, when the communication connection with the first electronic device 400 is established, the second electronic device 500 may request authentication information related to user authentication from the first electronic device 400. According to an example embodiment, the second electronic device 500 may include random data in the authentication information request and transmit the authentication information request.

In operation 1719, when the authentication information request is received from the second electronic device 500, the first electronic device 400 may output a related interface (for example, a GUI or a UI) for authenticating the user. According to an example embodiment, the first electronic device 400 may output a related interface for acquiring user's fingerprint information, and may listen to a fingerprint input by the user.

In operation 1721, the first electronic device 400 may acquire user information and authenticate the acquired user information. For example, the first electronic device 400 may scan a user fingerprint based on the fingerprint recognition sensor 475, and authenticate the user based on the scanned image.

In operation 1723, when the user authentication is completed (for example, when the user authentication is valid), the first electronic device 400 may generate control data including the result of the authentication (for example, signed data, user information, or the like). According to various example embodiments, the first electronic device 400 may generate first control data or second control data according to the type of the authentication information request of the second electronic device 500.

In operation 1725, the first electronic device 400 may transmit the control data to the second electronic device 500.

In operation 1727, when the control data is received from the first electronic device 400, the second electronic device 500 may authenticate the control data. According to an example embodiment, the second electronic device 500 may decrypt the control data using a public key of the first electronic device 400 which is pre-stored, and may determine whether the control data (for example, signed data) is valid or not.

In operation 1729, the second electronic device 500 may perform a corresponding operation based on the result of the authentication of the control data. According to an example embodiment, the second electronic device 500 may perform a logon operation. According to an example embodiment, the second electronic device 500 may input information (for example, account information, approval information, fingerprint information, or the like) necessary in the current use state of the second electronic device 500 using the user information.

Hereinafter, a method for reducing power consumption of the first electronic device 400 when the first electronic device 400 tries to connect communication with the second electronic device 500, but the second electronic device 500 is not able to connect communication according to whether the second electronic device 500 is in a hibernation or power off state or a communication function off state (for example, a Bluetooth off state) according to various example embodiments will be described.

Figure 18:
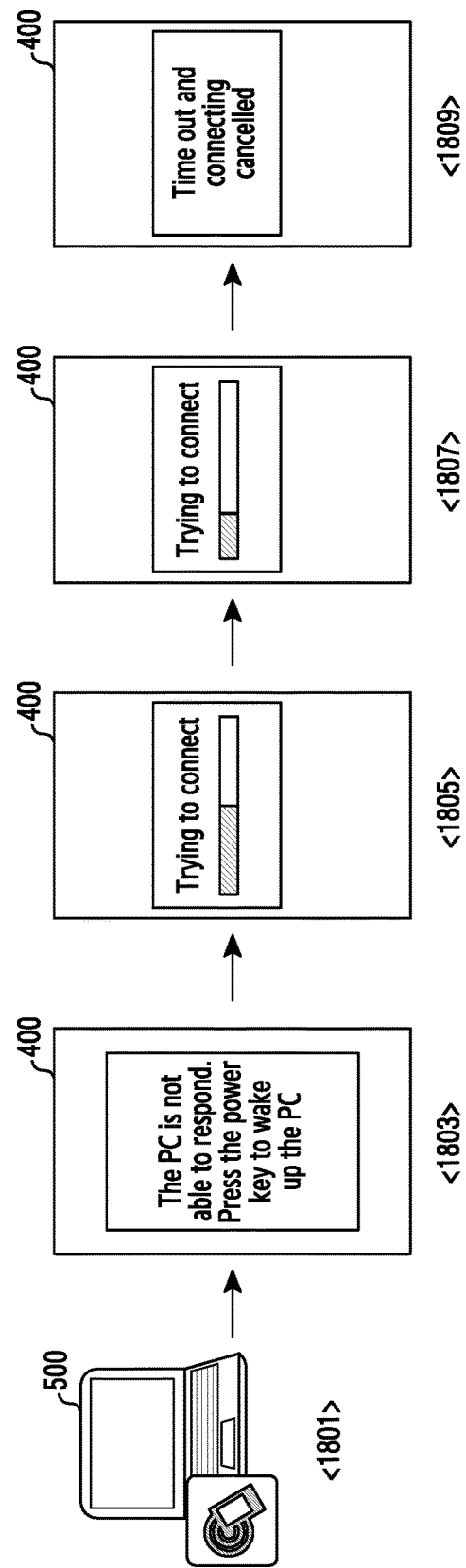
FIG. 18 is a diagram illustrating an example operation of connecting between electronic devices in a system according to various example embodiments of the present disclosure.

FIG. 18 is a diagram illustrating an example operation of connecting between electronic devices in a system according to various example embodiments of the present disclosure.

Referring to FIG. 18, in operation 1801, the first electronic device 400 and the second electronic device 500 may be tagged to each other by the user. According to an example embodiment, the user may bring the first electronic device 400 close to or into contact with the NFC tag 600 of the second electronic device 500 (for example, NFC tagging).

The first electronic device 400 may determine event triggering according to NFC tagging, and may try to connect communication with the second electronic device 500 (for example, a Bluetooth connection) based on connection information acquired through the NFC tag 600. When the first electronic device 400 tries to connect communication with the second electronic device 500, but does not receive a response from the second electronic device 500, the electronic device 400 may determine that the communication connection fails.

In operation 1803, when it is determined that the communication connection with the second electronic device 500 fails, the first electronic device 400 may display a related guide informing that the second electronic device 500 does not respond and guiding the user to wake up the second electronic device 500. For example, the first electronic device 400 may guide the user to wake up the second electronic device 500 by displaying a guide message (for example, "The PC was not able to respond. Press the power key to wake up the PC.") through the display 431. According to various example embodiments, the related guide may be provided by outputting a set sound (for example, a guide voice) through the speaker 441 of the electronic device 400, and may be provided with vibration feedback.

In operations 1805 and 1807, the first electronic device 400 may try to connect communication at predetermined time intervals until the second electronic device 500 is woken up and a communication connection is established (for example, a communication connection response is received). According to various example embodiments, the first electronic device 400 may operate to try to connect communication only during a predetermined time (for example, time T, for example, various times such as 10 seconds, 20 seconds, 30 seconds, 60 seconds, or the like are set according to time required to wake up the second electronic device 500). According to various example embodiments, the first electronic device 400 may provide information related to the trying to connect communication with the second electronic device 500 (for example, connection try information or count information) through a related interface (for example, a GUI or a UI). According to an example embodiment, as shown in operations 1805 and 1807, the first electronic device 400 may provide a text (for example, "Trying to connect") informing that the first electronic device 400 is trying to connect to the second electronic device 500, and an object (for example, a state progress bar) visually counting a predetermined time (for example, time T) and displaying the counted time based on a related interface.

In operation 1809, when the communication connection with the second electronic device 500 is not established during a predetermined time, for example, when the trying to connect communication times out, the first electronic device 400 may be set to cancel the trying (requesting) the Bluetooth connection. According to various example embodiments, the first electronic device 400 may notify the user that the trying to connect communication times out and is canceled. According to an example embodiment, the first electronic device 400 may notify the user that the communication connection is not established by displaying a related guide message (for example, "Time out and connection cancelled").

Figure 19:
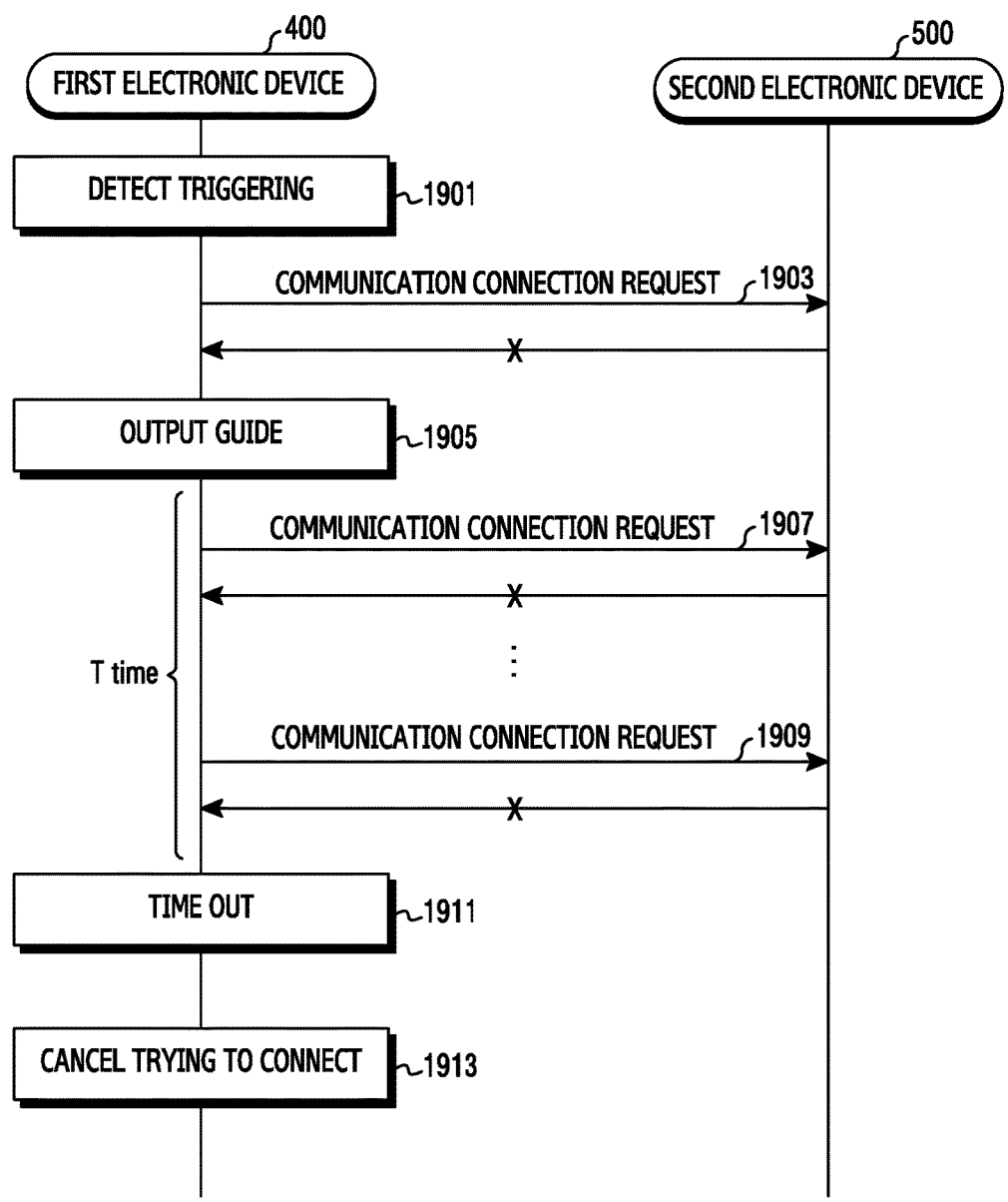
FIG. 19 is a signal flowchart illustrating an example operation of connecting communication between electronic devices in a system according to various example embodiments of the present disclosure.

FIG. 19 is a signal flowchart illustrating an example operation of connecting communication between electronic devices in a system according to various example embodiments of the present disclosure.

Referring to FIG. 19, in operation 1901, the first electronic device 400 may detect triggering. For example, the first electronic device 400 may detect triggering for connecting wireless communication with the second electronic device 500 in response to NFC tagging as shown in FIG. 18 described above. The first electronic device 400 may acquire connection information related to a connection with the second electronic device 500 from the NFC tag 600 according to the NFC tagging.

In operation 1903, the first electronic device 400 may try to connect communication with the electronic device 500 in response to the triggering being detected. According to an example embodiment, the first electronic device 400 may transmit a communication connection request for connecting Bluetooth communication with the second electronic device 500 to the second electronic device 500 based on the acquired connection information. According to various example embodiments, the second electronic device 500 may be in a hibernation or power off state or a communication function off state (for example, a Bluetooth off state). Accordingly, the second electronic device 500 may not respond to the communication connection request of the first electronic device 400.

In operation 1905, when the first electronic device 400 does not receive a response from the second electronic device 400 within a predetermined time after requesting the communication connection, the first electronic device 400 may output a guide. According to an example embodiment, when a response is not received from the second electronic device 500, the first electronic device 400 may determine that the communication connection fails and may display a related guide guiding the user to wake up the second electronic device 500.

In operations 1907 and 1909, the first electronic device 400 may continue to try to connect communication with the second electronic device 500 at predetermined time intervals during a predetermined time (for example, time T) in sequence or in parallel with outputting the guide. According to various example embodiments, the first electronic device 400 may process the trying to connect communication on a background until the second electronic device 500 is woken up and the communication connection is established (for example, a communication connection response is received), and may not receive a response until the second electronic device 500 is woken up. According to various example embodiments, the first electronic device 400 may operate to try to connect communication only during a predetermined time (for example, time T), and may count a predetermined time. According to various example embodiments, the first electronic device 400 may provide information related to the trying to connect communication with the second electronic device 500 (for example, connection try information, count information) through a related interface (for example, a GUI or a UI).

In operation 1911, when the electronic device 400 detects time out in response to the predetermined time being counted, the first electronic device 400 may cancel the trying to connect communication in operation 1913. According to an example embodiment, when the communication connection with the second electronic device 500 is not established during a predetermined time, for example, when the trying to connect communication times out, the first electronic device 400 may cancel the trying to connect Bluetooth.

Figure 20:
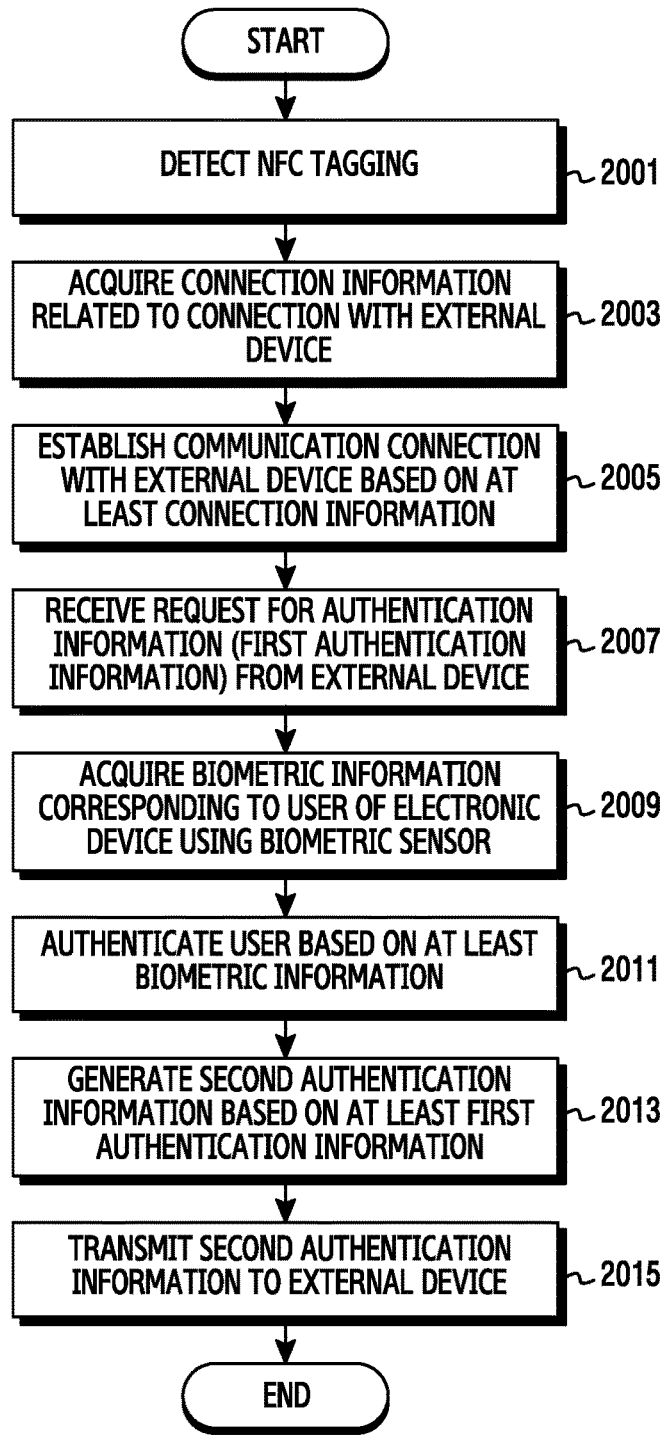
FIG. 20 is a flowchart illustrating an example method for connecting in an electronic device using authentication based on biometric information according to various example embodiments of the present disclosure.

FIG. 20 is a flowchart illustrating an example method for connecting using authentication based on biometric information in an electronic device according to various example embodiments of the present disclosure.

Referring to FIG. 20, in operation 2001, the controller 480 of the electronic device 400 may detect NFC tagging. According to an example embodiment, the controller 480 may detect the NFC tagging between the electronic device 400 and the external device 500 using a first communication circuit which supports NFC. According to various example embodiments, the controller 480 may determine triggering for connecting with the external device 500 in response to the NFC tagging.

In operation 2003, the controller 480 may acquire connection information related to a connection with the external device 500. For example, the controller 480 may acquire connection information related to a connection with the external device 500 from the external device 500 using the first communication circuit in response to the NFC tagging between the electronic device 400 and the external device 500. According to an example embodiment, the controller 480 may acquire tag information from the NFC tag 600 of the external device 500 according to the NFC tagging, and acquire connection information related to a wireless communication connection with the external device 500 form the tag information. According to various example embodiments, the connection information is information necessary for pairing with the external device 500, and for example, may include an address (for example, a MAC address) or a name of a Bluetooth device.

In operation 2005, the controller 480 may establish a communication connection with the external device 500 based on at least the connection information. For example, the controller 480 may establish the wireless communication connection with the external device 500 using a second communication circuit. According to an example embodiment, the controller 480 may try to connect non-NFC with the external device 500 based on the connection information related to the connection with the external device 500, and connect the non-NFC with the external device 500 in response to a response of the external device 500.

In operation 2007, the controller 480 may receive a request for authentication information from the external device 500. For example, the controller 480 may receive the request for the connection information from the external device 500 in response to the communication connection being established. According to various example embodiments, the request for the authentication information may include first authentication information (for example, random data) generated by the external device 500.

In operation 2009, the controller 480 may acquire biometric information corresponding to the user of the electronic device 400 using a biometric sensor. According to an example embodiment, the controller 480 may acquire biometric information of the user (for example, fingerprint information) using the fingerprint recognition sensor 475 of the electronic device 400.

In operation 2011, the controller 480 may authenticate the user based on at least the biometric information. According to an example embodiment, the controller 480 may scan a fingerprint corresponding to the user using the fingerprint recognition sensor 475, and authenticate the user based on the scanned image. For example, the controller 480 may acquire a fingerprint image from the scanned image, and compare the acquired fingerprint image and at least one fingerprint image which is pre-set by the user.

In operation 2013, the controller 480 may generate second authentication information based on at least the first authentication information. According to an example embodiment, when the authentication succeeds, the controller 480 may generate the second authentication information based on at least the first authentication information. According to various example embodiments, the electronic device 400 may store a key value corresponding to the external device 500 in the memory 450. According to various example embodiments, the electronic device 400 and the external device 500 may include a key value which is agreed in advance between the electronic device 400 and the external device 500. According to an example embodiment, the electronic device 400 may store a private key and the external device 500 may store a public key of the electronic device 400 corresponding to the private key. According to various example embodiments, the controller 480 may generate the second authentication information by encrypting the first authentication information received from the external device 500 based on at least the stored key value. According to various example embodiments, the controller 480 may generate first control data or second control data based on at least the second authentication information in response to the type of the request of the external device 500 for the authentication information.

In operation 2015, the controller 480 may transmit the second authentication information to the external device. According to an example embodiment, the controller 480 may transmit the second authentication information to the external device 500 via the non-NFC connected between the electronic device 400 and the external device 500.

As described above, an operation method of the electronic device 400 according to various example embodiments of the present disclosure includes the operations of: acquiring connection information related to a connection with the external device 500 from the external device 500 in response to NFC tagging between the first electronic device (for example, the electronic device 400, the first electronic device 400) and the external device (for example, the external device 500, the second electronic device 500); establishing a communication connection with the external device 500 based on at least the connection information; receiving a request for authentication information (for example, including the first authentication information) from the external device 500 in response to the communication connection being established; acquiring biometric information corresponding to the user of the electronic device 400 using a biometric sensor (for example, the biometric sensor 240I, the fingerprint recognition sensor 475) in response to the request; authenticating the user based on at least the biometric information; when the authenticating succeeds, generating second authentication information based on at least the first authentication information; and transmitting the second authentication information to the external device 500.

According to various example embodiments, the second authentication information may be used for the external device to authenticate the user for the external device.

According to various example embodiments, the request for the authentication information may include the first authentication information which is generated by the external device.

According to various example embodiments, the first authentication information may include random data which is generated by the external device.

According to various example embodiments, the operation of generating the second authentication information may include an operation of generating the second authentication information by encrypting the first authentication information based on at least a key value which is stored in a memory.

According to various example embodiments, the operation of generating the second authentication information may include an operation of determining a type of the request for the authentication information, and an operation of generating first control data or second control data according to the determined type.

According to various example embodiments, the operation of generating the second authentication information may include: an operation of determining a security level related to the requested authentication information based on the determined type; an operation of, when the security level is a first security level, generating the first control data based on the random data; and an operation of, when the security level is a second security level, generating the second control data based on the random data and user information.

According to various example embodiments, the operation of generating the second control data may include an operation of including account information, approval information, or biometric information in the second control data as the user information based on user authentication based on the biometric information.

According to various example embodiments, the external device connected with the electronic device may include: an operation of determining a use state in response to communication being connected with the electronic device; an operation of determining a security level corresponding to the determined use state; and an operation of transmitting the request corresponding to the determined security level to the electronic device, According to various example embodiments, the external device connected with the electronic device may include: an operation of receiving the second authentication information from the electronic device; an operation of decrypting the second authentication information based on the key value of the electronic device which is pre-stored, and authenticating the user of the electronic device based on the second authentication information; and an operation of performing a function of the external device or performing an input of user information based on at least a part of the second authentication information or the use state.

As described above, an operating method of the electronic device 400 according to various example embodiments of the present disclosure may include the operations of: acquiring connection information related to a connection with the external device (for example, the second electronic device 500) from the NFC tag 600 in response to NFC tagging; forming a communication connection with the external device 500 based on the acquired connection information; receiving an authentication information request from the external device 500 in response to the communication connection; acquiring biometric information related to user authentication through the biometric sensor in response to the authentication information request; generating control data corresponding to the authentication information requested by the external device 500 based on the acquired biometric information, and transmitting the generated control data to the external device 500.

According to various example embodiments, the operation of acquiring may include an operation of determining triggering for starting connecting communication with the external device in response to the NFC tagging.

According to various example embodiments, the connection information may be information for the electronic device to connect communication with the external device, and may include an address of the external device and a name of the external device.

According to various example embodiments, the authentication information request of the external device may include random data which is randomly generated by the external device.

According to various example embodiments, the operation of generating the control data may include an operation of, when the user authentication is completed based on the biometric information, generating the control data by encrypting the random data based on a pre-stored private key.

According to various example embodiments, the operation of generating the control data may include an operation of determining the type of the authentication information request and an operation of generating first control data or second control data according to the determined type.

According to various example embodiments, the operation of generating the control data may include an operation of determining a security level related to the requested authentication information based on the determined type, an operation of generating the first control data based on the random data when the security level is a first security level, and an operation of generating the second control data based on the random data and user information when the security level is a second security level.

According to various example embodiments, the operation of generating the second control data may include an operation of including account information, approval information, or biometric information in the second control data as the user information based on user authentication based on the biometric information.

According to various example embodiments, the external device 500 connected with the electronic device 400 may include an operation of determining a use state in response to the communication connection with the electronic device 400, an operation of determining a security level corresponding to the determined use state, and an operation of transmitting an authentication information request corresponding to the determined security level to the electronic device 400.

According to various example embodiments, the external device 500 connected with the electronic device 400 may include an operation of receiving control data from the electronic device 400, an operation of decrypting the control data based on a public key of the electronic device 400 which is pre-stored, and authenticating the electronic device 400, and an operation of performing a function of the external device 500 or performing a user information input based on at least a part of the control data or the use state.

According to an electronic device and an operating method thereof according to various example embodiments, information necessary for user authentication of the second electronic device not including a biometric sensor can be provided more safely and more easily using the first electronic device including a biometric sensor. According to various example embodiments, a wireless communication connection between the first electronic device and the second electronic device can be simply established by NFC tagging the first electronic device including the biometric sensor to the NFC tag of the second electronic device. According to various example embodiments, when wireless communication is connected between the first electronic device and the second electronic device, information which is required by the second electronic device in relation to user authentication is acquired by the first electronic device and automatically provided to the second electronic device. Accordingly, the user may perform an operation related to user authentication more easily and more simply by using the second electronic device not including the biometric sensor.

According to various example embodiments, when the first electronic device tries to connect communication with the second electronic device, the first electronic device may wake up or control to wake up the second electronic device according to the state of the second electronic device. According to various example embodiments, the first electronic device is set to try to connect wireless communication with the second electronic device during a predetermined time, such that power consumption of the first electronic device can be reduced.

While various example embodiments have been described in the detailed descriptions of the present disclosure, various changes can be made without departing from the scope of the present disclosure. Therefore, the scope of the present disclosure should not be limited to and defined by the above-described example embodiments, and should be defined not only by the appended claims but also by the equivalents to the scopes of the claims.

What is claimed is:

1. An electronic device comprising:
    a first communication circuit configured to support Near Field Communication (NFC);
    a second communication circuit configured to support non-NFC;
    a biometric sensor;
    a memory configured to store first authentication information corresponding to an external device; and
    a processor,
    wherein the processor is configured to:
    acquire connection information related to a connection with the external device from the external device using the first communication circuit in response to NFC tagging between the electronic device and the external device;
    establish a communication connection with the external device using the second communication circuit based on at least the connection information;
    receive a request for authentication information from the external device in response to the communication connection being established;
    acquire biometric information corresponding to a user of the electronic device using the biometric sensor in response to the request;
    authenticate the user based on at least the biometric information;
    when the authenticating succeeds, generate second authentication information based on at least the first authentication information; and
    transmit the second authentication information to the external device, and
    wherein the external device connected with the electronic device is configured to:
        determine a use state of the external device in response to communication being established with the electronic device;
        determine a security level corresponding to the determined use state;
        transmit the request corresponding to the determined security level to the electronic device;
        receive the second authentication information from the electronic device;
        decrypt the second authentication information based on a key value of the electronic device which is pre-stored;
        authenticate the user of the electronic device based on the second authentication information; and
        perform an operation related to a function of the external device or an operation related to a user information input based on at least a part of the second authentication information or the use state.

2. The electronic device of claim 1, wherein the second authentication information comprises information for the external device to authenticate the user for the external device.

3. The electronic device of claim 1, wherein the request for the authentication information comprises the first authentication information generated by the external device.

4. The electronic device of claim 3, wherein the first authentication information comprises random data generated by the external device.

5. The electronic device of claim 4, wherein the memory is configured to store a key value, and
    wherein the processor is configured to generate the second authentication information by encrypting the first authentication information based on at least the key value.

6. The electronic device of claim 4, wherein the processor is configured to:
    determine a type of the request for the authentication information; and
    generate one of first control data or second control data based on the determined type.

7. The electronic device of claim 6, wherein the processor is configured to:
    determine a security level of the requested authentication information based on the determined type;
    generate the first control data based on the random data when the security level is a first security level; and
    generate the second control data based on the random data and user information when the security level is a second security level.

8. The electronic device of claim 7, wherein the processor is configured to include at least one of: account information, approval information, or biometric information in the second control data as the user information based on user authentication based on the biometric information.

9. A method of operating an electronic device, the operating method comprising:
    acquiring connection information related to a connection with an external device from the external device in response to Near Field Communication (NFC) tagging between the electronic device and the external device;
    establishing a communication connection with the external device based on at least the connection information;
    receiving a request for authentication information from the external device in response to the communication connection being established;
    acquiring biometric information corresponding to a user of the electronic device using a biometric sensor in response to the request;
    authenticating the user based on at least the biometric information;
    when the authenticating succeeds, generating second authentication information based on at least the first authentication information; and
    transmitting the second authentication information to the external device, and
    wherein the establishing the communication connection with the external device further comprises:

determining, by the external device, a use state of the external device in response to communication being established with the electronic device;

determining, by the external device, a security level corresponding to the determined use state;

transmitting, by the external device, the request corresponding to the determined security level to the electronic device;

receiving, by the external device, the second authentication information from the electronic device;

decrypting, by the external device, the second authentication information based on a key value of the electronic device which is pre-stored;

authenticating, by the external device, the user of the electronic device based on the second authentication information; and performing, by the external device, one of an operation related to a function of the external device or an operation related to a user information input based on at least a part of the second authentication information or the use state.

10. The method of claim 9, wherein the second authentication information comprises information used for the external device to authenticate the user for the external device.

11. The method of claim 9, wherein the request for the authentication information comprises the first authentication information generated by the external device, and wherein the first authentication information comprises random data generated by the external device.

12. The method of claim 11, wherein the generating the second authentication information comprises generating the second authentication information by encrypting the first authentication information based on at least a key value stored in a memory.

13. The method of claim 11, wherein the generating the second authentication information comprises:

determining a type of the request for the authentication information; and generating one of first control data or second control data based on the determined type.

14. The method of claim 13, wherein the generating the second authentication information comprises:

determining a security level related to the requested authentication information based on the determined type;

generating the first control data based on the random data when the security level is a first security level; and generating the second control data based on the random data and user information when the security level is a second security level.

15. The method of claim 14, wherein the generating the second control data comprises including at least one of: account information, approval information, or biometric information in the second control data as the user information based on user authentication based on the biometric information.

16. A non-transitory computer readable recording medium having a program recorded thereon, which, when executed by a processor, causes an electronic device to perform operations comprising: acquiring connection information related to a connection with an external device; establishing a communication connection with the external device based on at least the connection information; receiving a request for authentication information from the external device; acquiring biometric information corresponding to a user of the electronic device using a biometric sensor; authenticating the user based on at least the biometric information; when the authenticating succeeds, generating second authentication information based on at least the first authentication information; and transmitting the second authentication information to the external device, and wherein the establishing the communication connection with the external device further comprises: determining, by the external device, a use state of the external device in response to communication being established with the electronic device; determining, by the external device, a security level corresponding to the determined use state; transmitting, by the external device, the request corresponding to the determined security level to the electronic device; receiving, by the external device, the second authentication information from the electronic device; decrypting, by the external device, the second authentication information based on a key value of the electronic device which is pre-stored; authenticating, by the external device, the user of the electronic device based on the second authentication information; and performing, by the external device, one of an operation related to a function of the external device or an operation related to a user information input based on at least a part of the second authentication information or the use state.

* * * * *